(12) United States Patent
Davids

(10) Patent No.: US 8,321,417 B2
(45) Date of Patent: Nov. 27, 2012

(54) METHOD OF VISUALIZING THE COLLECTIVE OPINION OF A GROUP

(75) Inventor: Alexander L Davids, Toronto (CA)

(73) Assignee: 6464076 Canada Inc., Toronto (CA)

(*) Notice: Subject to any disclaimer, the term of this patent is extended or adjusted under 35 U.S.C. 154(b) by 0 days.

(21) Appl. No.: 13/228,404

(22) Filed: Sep. 8, 2011

(65) Prior Publication Data

US 2012/0096014 A1    Apr. 19, 2012

Related U.S. Application Data

(60) Provisional application No. 61/393,283, filed on Oct. 14, 2010.

(51) Int. Cl.
   *G06F 17/30* (2006.01)
(52) U.S. Cl. .................................... 707/737; 707/749
(58) Field of Classification Search ............ 707/737, 707/748, 749, 752
   See application file for complete search history.

(56) References Cited

U.S. PATENT DOCUMENTS

| | | | |
|---|---|---|---|
| 6,311,190 B1* | 10/2001 | Bayer et al. | 1/1 |
| 2002/0082949 A1* | 6/2002 | Desormeaux et al. | 705/27 |
| 2008/0103880 A1* | 5/2008 | Saaty | 705/12 |

* cited by examiner

*Primary Examiner* — Tony Mahmoudi
*Assistant Examiner* — Md. I Uddin
(74) *Attorney, Agent, or Firm* — Stephen E. Zweig

(57) ABSTRACT

A computerized method of visualizing the collective opinion of a group regarding one or more qualitative issues. The group initially selects N issues from the universe of potential issues and often assigns the issues images and titles. The system presents each user with graphical user interface screens wherein individual users vote on the relative importance and degree of relationship between the N aspects (Data Points) and issues, often using drag and drop methods. The software computes N×N similarity matrices based on users voting input and clusters various aspects into groups of greater and lesser similarity and importance, and presents results of users qualitative ranking in easy to read relationship tree diagrams where the relative importance and qualitative relationship of the issues may be designated by size and other graphical markers. The software may reside on a network server and present display screens to web browsers running on users computerized devices.

14 Claims, 30 Drawing Sheets

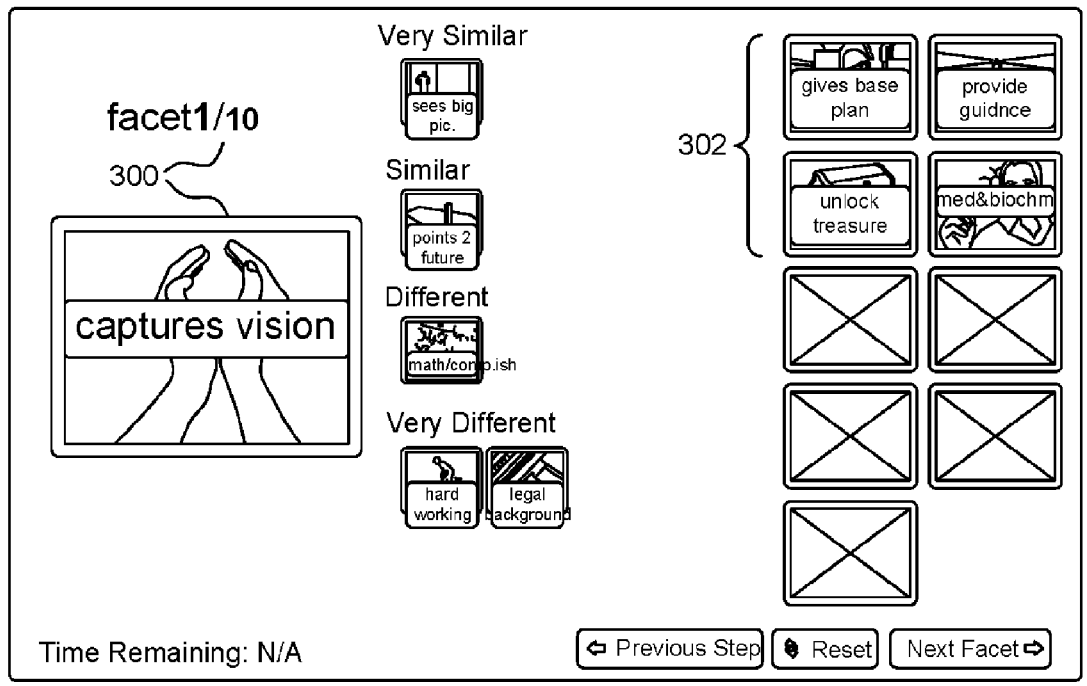
Figure 3B
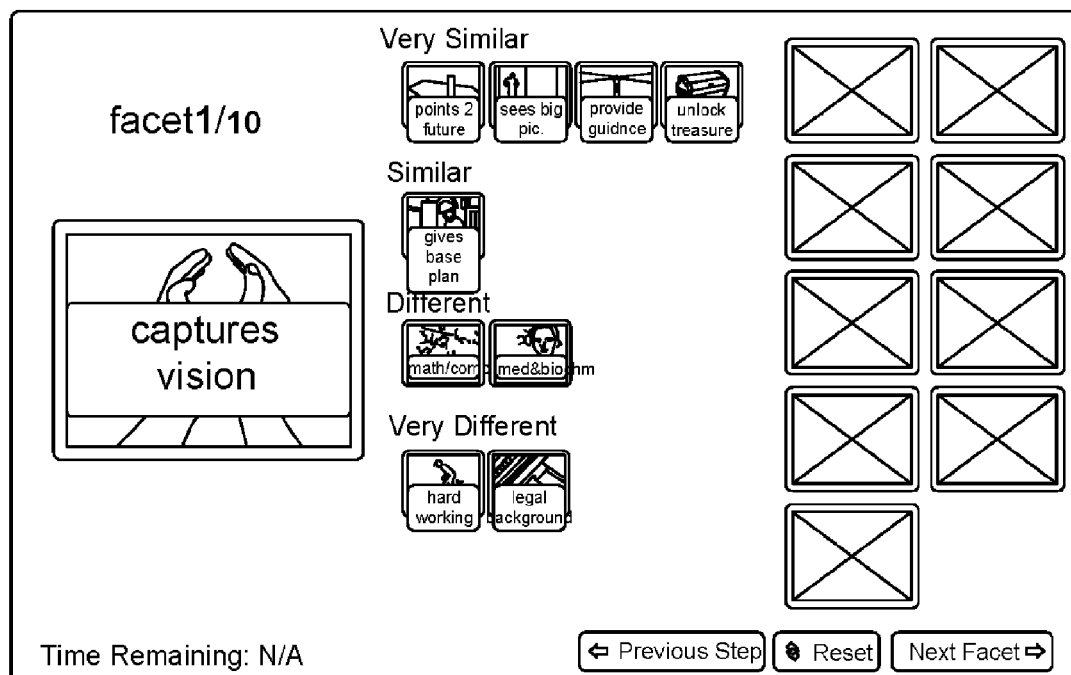

|  | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 2 | 0 | 0 | 0 | 0 | 0 | 0 | 0 | 0 | 0 |
| Data Point 2 | 0 | 2 | 0 | 0 | 0 | 0 | 0 | 0 | 0 | 0 |
| Data Point 3 | 0 | 0 | 2 | 0 | 0 | 0 | 0 | 0 | 0 | 0 |
| Data Point 4 | 0 | 0 | 0 | 2 | 0 | 0 | 0 | 0 | 0 | 0 |
| Data Point 5 | 0 | 0 | 0 | 0 | 2 | 0 | 0 | 0 | 0 | 0 |
| Data Point 6 | 0 | 0 | 0 | 0 | 0 | 2 | 0 | 0 | 0 | 0 |
| Data Point 7 | 0 | 0 | 0 | 0 | 0 | 0 | 2 | 0 | 0 | 0 |
| Data Point 8 | 0 | 0 | 0 | 0 | 0 | 0 | 0 | 2 | 0 | 0 |
| Data Point 9 | 0 | 0 | 0 | 0 | 0 | 0 | 0 | 0 | 2 | 0 |
| Data Point 10 | 0 | 0 | 0 | 0 | 0 | 0 | 0 | 0 | 0 | 2 |

Sample similarity matrix (user A & user B combined)

|  | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 4 | ③ | 0 | -1 | 2 | 4 | 3 | 3 | 0 | 4 |
| Data Point 2 | ③ | 4 | 3 | 4 | 2 | -1 | 2 | 4 | 0 | 4 |
| Data Point 3 | 0 | 3 | 4 | 3 | 3 | 1 | 3 | 1 | 1 | 0 |
| Data Point 4 | -1 | 4 | 3 | 4 | -1 | 2 | 4 | 1 | 4 | 0 |
| Data Point 5 | 2 | 2 | 3 | -1 | 4 | 3 | -3 | 3 | -2 | 3 |
| Data Point 6 | 4 | -1 | 1 | 2 | 3 | 4 | 3 | 4 | 1 | 3 |
| Data Point 7 | 3 | 2 | 3 | 4 | -3 | 3 | 4 | 3 | 4 | 3 |
| Data Point 8 | 3 | 4 | 1 | 1 | 3 | 4 | 3 | 4 | 3 | 4 |
| Data Point 9 | 0 | 0 | 0 | 4 | -2 | 1 | 4 | 3 | 4 | 0 |
| Data Point 10 | 4 | 4 | 1 | 0 | 3 | 3 | 3 | 4 | 0 | 4 |

Figure 7

| | Captures vision | Points 2 future | Gives base plan | Provide guidance | Unlock treasure | Sees big pict. | Legal background | Math/Comput. |
|---|---|---|---|---|---|---|---|---|
| Captures vision | 0 | 1 | 2 | 1 | 1 | 0 | 8 | 6 |
| Points 2 future | 1 | 0 | 0 | 0 | 1 | 1 | 6 | 4 |
| Gives base plan | 2 | 0 | 0 | 0 | 2 | 0 | 1 | 5 |
| Provide guidance | 1 | 0 | 0 | 0 | 1 | 1 | 0 | 6 |
| Unlock treasure | 1 | 1 | 2 | 1 | 0 | 2 | 5 | 2 |
| Sees big. pict. | 0 | 1 | 0 | 1 | 2 | 0 | 2 | 6 |
| Legal background | 8 | 6 | 1 | 0 | 5 | 2 | 0 | 7 |
| Math/comput. | 6 | 4 | 5 | 6 | 2 | 6 | 7 | 0 |
| Med & biochem | 6 | 4 | 7 | 4 | 2 | 6 | 7 | 1 |
| Hard working | 8 | 8 | 7 | 6 | 2 | 7 | 4 | 1 |

Figure 8

|  | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 18 | 7 | 0 | 2 | 1 | 15 | 4 | 15 | -5 | 17 |
| Data Point 2 | 7 | 18 | -1 | 12 | 15 | 9 | -5 | 8 | 3 | 10 |
| Data Point 3 | 0 | -1 | 18 | 9 | -1 | 0 | 4 | 2 | 3 | 5 |
| Data Point 4 | 2 | 12 | 9 | 18 | 5 | 9 | 12 | 10 | 16 | 11 |
| Data Point 5 | 1 | 15 | -1 | 5 | 18 | 3 | -13 | 7 | -11 | 10 |
| Data Point 6 | 15 | 9 | 0 | 9 | 3 | 18 | 11 | 16 | 4 | 15 |
| Data Point 7 | 4 | -5 | 4 | 12 | -13 | 11 | 18 | 7 | 15 | 9 |
| Data Point 8 | 15 | 8 | 2 | 10 | 7 | 16 | 7 | 18 | 2 | 17 |
| Data Point 9 | -5 | 3 | 3 | 16 | -11 | 4 | 15 | 2 | 18 | 3 |
| Data Point 10 | 17 | 10 | 5 | 11 | 10 | 15 | 9 | 17 | 3 | 18 |

Figure 9

|  | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 0 | 11 | 18 | 16 | 17 | 3 | 14 | 3 | 23 | 1 |
| Data Point 2 | 11 | 0 | 19 | 6 | 3 | 9 | 23 | 10 | 15 | 8 |
| Data Point 3 | 18 | 19 | 0 | 9 | 19 | 18 | 14 | 16 | 15 | 13 |
| Data Point 4 | 16 | 6 | 9 | 0 | 13 | 9 | 6 | 8 | 2 | 7 |
| Data Point 5 | 17 | 3 | 19 | 13 | 0 | 15 | 31 | 11 | 29 | 8 |
| Data Point 6 | 3 | 9 | 18 | 9 | 15 | 0 | 7 | 2 | 14 | 3 |
| Data Point 7 | 14 | 23 | 14 | 6 | 31 | 7 | 0 | 11 | 3 | 9 |
| Data Point 8 | 3 | 10 | 16 | 8 | 11 | 2 | 11 | 0 | 16 | 1 |
| Data Point 9 | 23 | 15 | 15 | 2 | 29 | 14 | 3 | 16 | 0 | 15 |
| Data Point 10 | 1 | 8 | 13 | 7 | 8 | 3 | 9 | 1 | 15 | 0 |

Figure 10

| | Data Point 1/10 | Data Point 2 | Data Point 3 | Data Point 4 | Data Point 5 | Data Point 6 | Data Point 7 | Data Point 8 | Data Point 9 |
|---|---|---|---|---|---|---|---|---|---|
| Data Point 1/10 | 0 | 8 | 13 | 7 | 8 | 3 | 9 | 1 | 15 |
| Data Point 2 | 8 | 0 | 19 | 6 | 3 | 9 | 23 | 10 | 15 |
| Data Point 3 | 13 | 19 | 0 | 9 | 19 | 18 | 14 | 16 | 15 |
| Data Point 4 | 7 | 6 | 9 | 0 | 13 | 9 | 6 | 8 | 2 |
| Data Point 5 | 8 | 3 | 19 | 13 | 0 | 15 | 31 | 11 | 29 |
| Data Point 6 | 3 | 9 | 18 | 9 | 15 | 0 | 7 | 2 | 14 |
| Data Point 7 | 9 | 23 | 14 | 6 | 31 | 7 | 0 | 11 | 3 |
| Data Point 8 | 1 | 10 | 16 | 8 | 11 | 2 | 11 | 0 | 16 |
| Data Point 9 | 15 | 15 | 15 | 2 | 29 | 14 | 3 | 16 | 0 |

Figure 16

| | Data Point 1 | Data Point 2 | Data Point 3 | Data Point 4 | Data Point 5 | Data Point 6 | Data Point 7 | Data Point 8 | Data Point 9 | Data Point 10 | Voter Mode |
|---|---|---|---|---|---|---|---|---|---|---|---|
| User A | 1 | 1 | 2 | 1 | 1 | 1 | 3 | 2 | 1 | 1 | 1 |
| User B | 1 | 2 | 1 | 3 | 2 | 2 | 3 | 1 | 2 | 2 | 2 |
| User C | 1 | 1 | 4 | 2 | 2 | 1 | 1 | 1 | 3 | 2 | 1 |
| User D | 1 | 1 | 2 | 2 | 1 | 1 | 2 | 1 | 2 | 2 | 1 |
| User E | 2 | 1 | 2 | 3 | 2 | 1 | 2 | 1 | 2 | 2 | 2 |
| User F | 3 | 2 | 3 | 3 | 3 | 3 | 2 | 2 | 1 | 3 | 3 |
| User G | 3 | 1 | 4 | 3 | 1 | 1 | 3 | 2 | 2 | 2 | 3 |
| User H | 1 | 3 | 2 | 3 | 2 | 2 | 3 | 1 | 2 | 2 | 2 |
| User I | 4 | 3 | 4 | 3 | 2 | 3 | 3 | 3 | 3 | 3 | 3 |

Figure 18

|  | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 2 | 2 | 2 | 2 | -1 | 1 | 1 | 2 | 1 | 2 |
| Data Point 2 | 2 | 2 | -2 | 2 | 2 | 2 | -1 | -1 | 2 | 2 |
| Data Point 3 | 2 | -2 | 2 | 2 | -2 | -1 | 2 | 2 | 2 | 2 |
| Data Point 4 | 2 | 2 | 2 | 2 | 2 | 2 | 2 | 1 | 1 | 2 |
| Data Point 5 | -1 | 2 | -2 | 2 | 2 | -2 | -2 | -2 | -2 | -1 |
| Data Point 6 | 1 | 2 | -1 | 2 | -2 | 2 | 2 | 1 | 1 | 1 |
| Data Point 7 | 1 | -1 | 2 | 2 | -2 | 2 | 2 | 2 | 2 | 2 |
| Data Point 8 | 2 | -1 | 2 | 1 | -2 | 1 | 2 | 2 | 2 | 2 |
| Data Point 9 | 1 | 2 | 2 | 1 | -2 | 1 | 2 | 2 | 2 | 2 |
| Data Point 10 | 2 | 2 | 2 | 2 | -1 | 1 | 2 | 2 | 2 | 2 |

|  | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 18 | 7 | 0 | 2 | 1 | 15 | 4 | 15 | -5 | 17 |
| Data Point 2 | 7 | 18 | -1 | 12 | 15 | 9 | -5 | 8 | 3 | 10 |
| Data Point 3 | 0 | -1 | 18 | 9 | -1 | 0 | 4 | 2 | 3 | 5 |
| Data Point 4 | 2 | 12 | 9 | 18 | 5 | 9 | 12 | 10 | 16 | 11 |
| Data Point 5 | 1 | 15 | -1 | 5 | 18 | 3 | -13 | 7 | -11 | 10 |
| Data Point 6 | 15 | 9 | 0 | 9 | 3 | 18 | 11 | 16 | 4 | 15 |
| Data Point 7 | 4 | -5 | 4 | 12 | -13 | 11 | 18 | 7 | 15 | 9 |
| Data Point 8 | 15 | 8 | 2 | 10 | 7 | 16 | 7 | 18 | 2 | 17 |
| Data Point 9 | -5 | 3 | 3 | 16 | -11 | 4 | 15 | 2 | 18 | 3 |
| Data Point 10 | 17 | 10 | 5 | 11 | 10 | 15 | 9 | 17 | 3 | 18 |

Figure 19

|              | Data Point 1 | Data Point 2 | Data Point 3 | Data Point 4 | Data Point 5 | Data Point 6 | Data Point 7 | Data Point 8 | Data Point 9 | Data Point 10 |
|---|---|---|---|---|---|---|---|---|---|---|
| Data Point 1 | 0 | 1 | 2 | 2 | 1 | 1 | 1 | 0 | 2 | 0 |
| Data Point 2 | 1 | 0 | 2 | 1 | 0 | 1 | 0 | 2 | 2 | 1 |
| Data Point 3 | 2 | 2 | 0 | 1 | 2 | 1 | 2 | 2 | 2 | 1 |
| Data Point 4 | 2 | 1 | 1 | 0 | 1 | 1 | 1 | 0 | 1 | 1 |
| Data Point 5 | 1 | 0 | 2 | 1 | 0 | 2 | 1 | 3 | 1 | 2 |
| Data Point 6 | 1 | 1 | 1 | 1 | 2 | 0 | 1 | 1 | 1 | 1 |
| Data Point 7 | 1 | 0 | 2 | 1 | 1 | 1 | 0 | 1 | 0 | 0 |
| Data Point 8 | 0 | 2 | 2 | 0 | 3 | 1 | 1 | 0 | 2 | 2 |
| Data Point 9 | 2 | 2 | 2 | 1 | 1 | 1 | 0 | 2 | 0 | 0 |
| Data Point 10 | 1 | 1 | 2 | 1 | 2 | 0 | 1 | 1 | 2 | 0 |

Level of Agreement

| User | Agreement Level with Final Clustering Results |
|---|---|
| User C | 91% |
| User F | 89% |
| User B | 78% |
| User D | 66% |
| User G | 64% |
| User H | 59% |
| User I | 55% |
| User A | 49% |
| User E | 31% |

2 users agree more than 80% with final results
5 users agree 50 – 79% with final results
2 users agree less than 50% with final results

Figure 23

Voting Patterns – Pre-defined Groups

Enter the Name of the Pre-defined Group (e.g. Age, Sex, Department, Company, etc.)

[Enter Name of Group Here] [Add]

Enter the input values of the Pre-defined Group

[Selection 1] [Add]

[Selection 2] [Add]

[Selection 3] [Add]

Add More Selection

Next

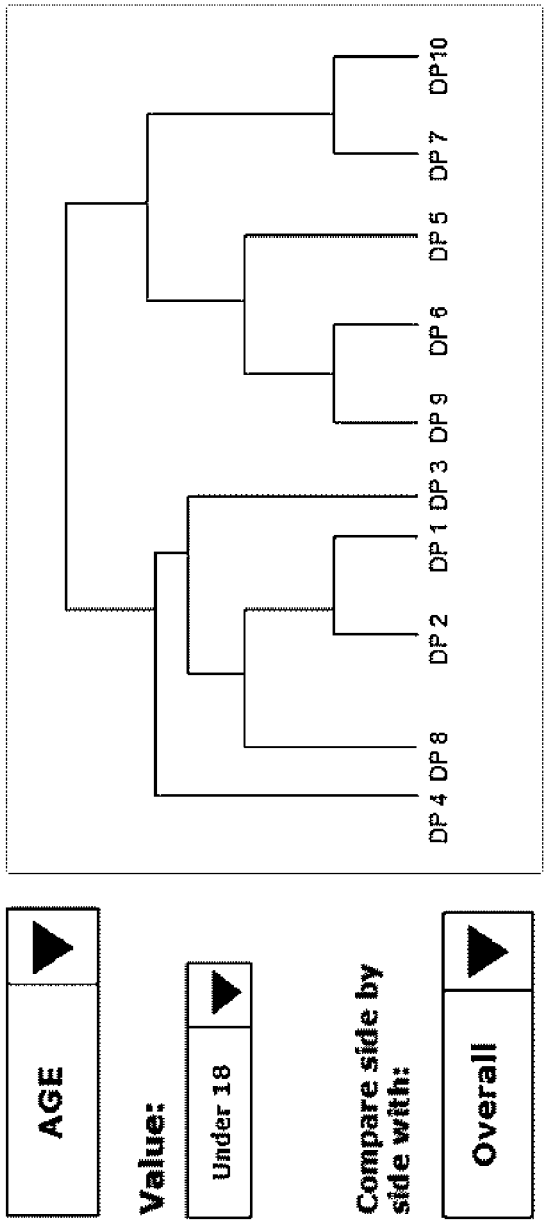

METHOD OF VISUALIZING THE COLLECTIVE OPINION OF A GROUP

This application claims the priority benefit of provisional patent application 61/393,283, "METHOD OF VISUALIZING THE COLLECTIVE OPINION OF A GROUP", inventor Alexander L. Davids, filed Oct. 14, 2010, the contents of which are incorporated herein by reference.

BACKGROUND OF THE INVENTION

1. Field of the Invention

The invention is in the general field of computerized decision-making tools, in particular tools for qualitative analysis of issues such as corporate, product, service or cause branding, marketing, business strategy and communications messaging.

2. Description of the Related Art

In some areas of group decision making, particularly areas relating to taste or subjective opinions or qualitative assessment, often the collective opinions of a large group of individuals are viewed as the most optimal or "best" solution.

In the business world, this sort of statistical averaging approach is somewhat related to problems encountered in certain types of group decision-making, here exemplified by brand management Branding, (e.g. a corporate, product, service or cause branding) essentially is a way for a business to identify a product, range of products, or organization that, on the one hand, helps identify unique aspects of the product(s) or organization that will be useful to consumers, help make the product or organization attractive to consumers, and also helps distinguish the product or organization from competitors.

As a result, the disciplines of branding, brand analysis, brand strategy, marketing and business strategy have emerged that attempt to capture these considerations, and distil them into a unique message, statement, idea, set of ideas or attributes like a positioning statement, personality traits, brand promise, values, vision statement, purpose or mission statement that best represents the offer or organization in question. Here, the perspectives from a large number of different individuals who are familiar with the issues, subject, work, offer, solution, values, characteristics, traits, attributes, features, benefits, disadvantages, weaknesses, messages, statements, positions, personalities, promises, values, visions, purposes or missions (collectively referred to as "issues") can be very valuable, because each individual will bring to the analysis their own way of looking at things, and a larger diversity of opinions will in general be more likely to capture the many different opinion and views that the outside world of individuals may have or will have about the issues or offer.

Unfortunately, prior art methods of group decision making, brand analysis and brand strategy tended to not effectively harness the diversity of opinions and insight that larger groups can bring to a particular problem. Group meetings, for example, quickly tend to become dominated by a few individuals, with the rest of the group often eventually deferring to a formal or informal leader, thus harnessing only a fraction of the group brainpower. Prior art computerized group decision methods, exemplified by U.S. Pat. Nos. 7,177,851; 7,308,418 and U.S. patent application Ser. Nos. 10/848,989; 10/874,806; 11/181,644; 11/672,930; 11/672,930 and others tended to be cumbersome and difficult for non-expert users to use, and as a result failed to fully capture group insights into brand marketing and other types of group decision making.

BRIEF SUMMARY OF THE INVENTION

The present invention is a simplified method of determining group collective viewpoint on various qualitative problems, here exemplified by brand marketing problems, which utilizes a software program and method with a simple graphical user interface, suitable for unskilled users. This simplified graphical user interface is used to capture input from a plurality of individuals, and this input data is then mathematically prioritized, clustered, and displayed in the form of simple graphical output, as well as supplemental mathematical output for more detailed analysis. The simplified user graphical data entry interface and simple graphical data output interface, along with supplemental detailed data as requested, help make the group decision making process both transparent, effective, and fast.

In one embodiment, the invention may be a computerized method of determining a group viewpoint on qualitative issues, such as brand marketing issues. Here the N highest importance aspects of the issue are selected by the group and often assigned images and titles. The system will typically present each user with one or more graphical user interface screens wherein the individual users will vote on the relative importance and degree of relationship between the N aspects (Data Points), often using drag and drop methods. The software will compute N×N similarity matrices and cluster the various aspects into groups of greater and lesser similarity and importance, and present the results to the user in the form of easy to read relationship tree diagrams (or other relationship diagrams such as nodal maps) where the relative importance of the issues may be designated by size and other markers such as graphic markers or numeric ratings. The software may reside on a network server and present these display screens to web browsers running on user computerized devices.

BRIEF DESCRIPTION OF THE DRAWINGS

FIG. 3B shows screen shots from two different users who are each voting on the relative similarity between the top ten issues. Here the first issue or Data Point is being voted on. Note that this first issue or Data Point "Captures vision" was previously assigned by both voters as being extremely important. User one (top) is partway through the process, but has still not assigned four issues (gives base plan, unlock treasure, provide guidance, med& biochem) as to similarity. User two (bottom) has finished the process. Again, although there is some agreement between the assignments as to similarity, the two votes are not identical.

FIG. 3C shows screen shots from two different users who are each voting on the relative similarity between the top ten issues or Data Points. Here the $9^{th}$ issue is being voted on. This $9^{th}$ issue or Data Point was previously rated as very unimportant by user one, and thus had an overall lower average importance rating. User one (top) is partway through the process, but has still not assigned four issues (gives base plan, unlock treasure, provide guidance, med& biochem) as to similarity. User two (bottom) has finished the process. Again, although there is some agreement between the assignments as to similarity, the two votes are not identical.

FIG. 4 shows a mockup user interface for summary of individual user's voting results.

FIG. 5 shows a sample user matrix (default).

FIG. 6 shows a sample similarity matrix for User A and User B.

FIG. 7 shows the actual similarity matrix produced by the users who were previously voting in FIGS. 2B, 3B, and 3C.

FIG. 8 shows a sample user similarity matrix of nine users.

FIG. 9 shows a similarity matrix transformed to positive scale.

FIG. 10 shows a single linkage hierarchical clustering—first iteration

FIG. 16 shows a summary of grouping results for all Data Points and voter modes

FIG. 18 shows a sample user matrix for user A.

FIG. 19 shows a sample overall similarity matrix.

FIG. 20 shows a sample difference matrix.

FIG. 21 shows a sample report of level of agreement.

FIG. 23 shows a sample admin interface for setting up pre-defined groups.

FIG. 24 shows a sample display of clustering results for a pre-defined age group.

DETAILED DESCRIPTION OF THE INVENTION

The computer software and algorithms of this invention are typically designed to run under the control of one or more microprocessors and computer memory, accept input by one or more standard graphical user interfaces, and also provide output by one or more graphical user interfaces. In order to facilitate group interaction, often the software will be intended to run on an Internet Web server, connected to a plurality of user interface devices, such as Apple Wads, laptop computers and the like, often running in web browsers on these devices. Ideally, each participant in the process will have access to their own user interface device, although of course users may share user interface devices as needed. Often, to facilitate group collaboration and decision making, the output from the software will be projected onto large screens intended for group viewing, using standard video projectors and the like. Alternatively, of course, the output may itself be transmitted over a network, such as the Internet, and be viewed on, for example, web browsers running on various individual user computerized devices. This later configuration will be useful when, for example, group collaboration between group members separated by a significant distance is desired.

At the broadest level, the invention is a method to provide insight on individual or group perceived differences between various concepts or issues. In order to provide a simple and convenient identifier for these various concepts or issue, according to the invention the various concepts or issues will often be identified by various visual and/or verbal Data Points. For purposes of providing a simple user interface, these visual and/or verbal Data Points that symbolize the concepts or issues will often be identified in the form of an image, usually with a short descriptive text name attached.

Figure 1A:
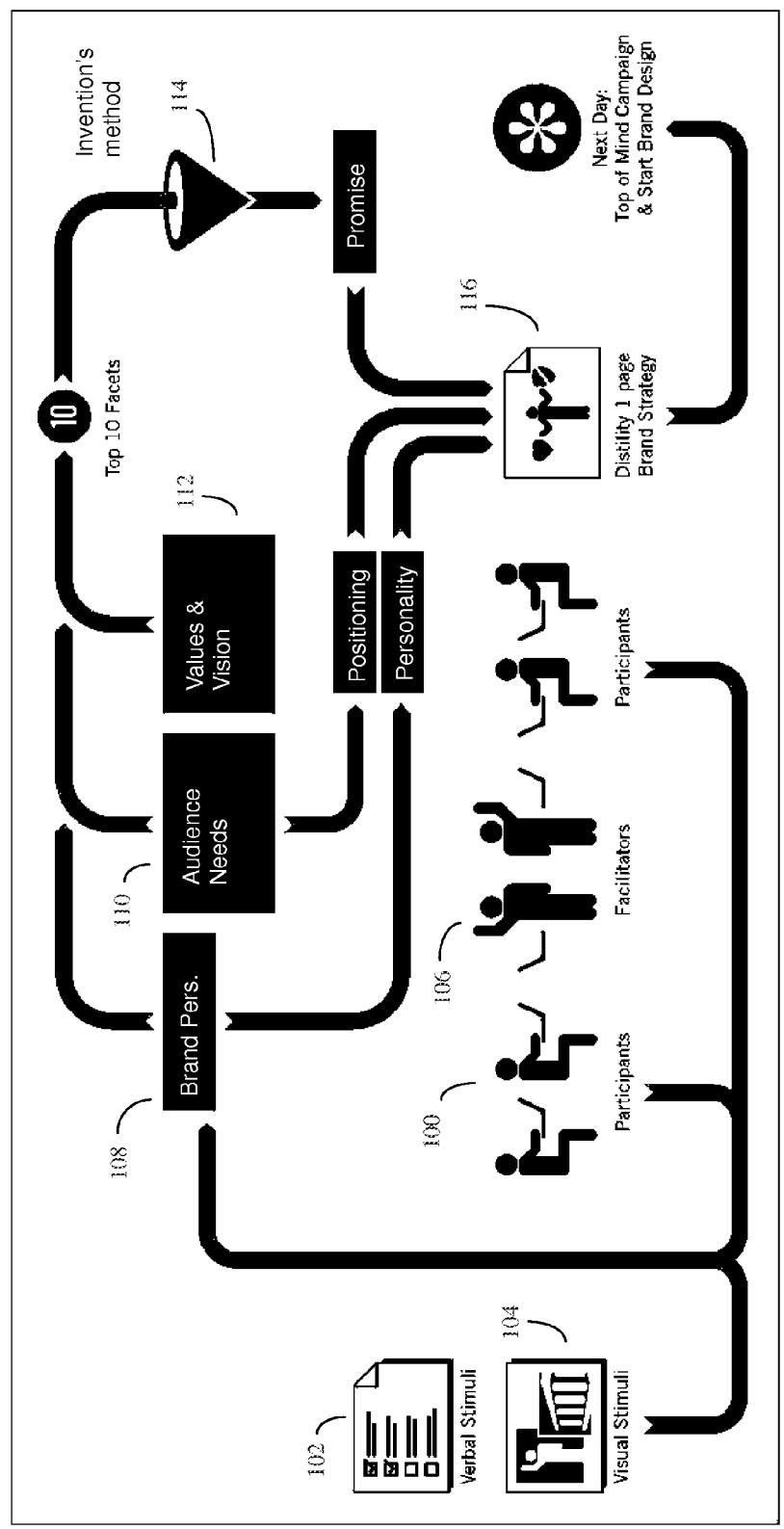
FIG. 1A shows an example of a qualitative problem that requires a group consensus. Here the problem is one of capturing the knowledge of an informed group, and translating this knowledge into an appropriate marketing brand.

FIG. 1A shows an example of a complex qualitative problem that requires group input, along with an example of one embodiment of the decision making process that can be facilitated by the methods of this invention. Here the problem is one of capturing, the knowledge of an informed group, and translating this knowledge into an appropriate marketing brand.

In this example, the process begins by first prompting the group participants (100) through verbal (102) and visual (104) stimuli to start identifying the various qualitative issues that are likely to be most relevant to the problem. In some embodiments, human facilitators (106) who are familiar with this basic process may be used to help guide the process, while in other embodiments, software "wizards", expert systems, or help software may do the same thing. Here the participants are being asked to identify key qualitative issues relevant to branding, such as the brand personality (108) (here the personality of a brand of trendy clothes for teenage girls will clearly be quite different from the personality of a brand intended for the elderly), the needs of the audience of consumers of the product or services being potentially offered by the (to be) brand (110), which relates to the brand positioning, and also other relevant marketing issues such as the company or product values, vision, culture or history of the various products, services, or company behind the brand (112). From this analysis, with the aid of the invention, group consensus as to the top issues (here the top ten issues, facets or Data Points) are identified, their relative importance weighted, and the concepts are clustered in ways that, as will be discussed, will facilitate group decision making (114), here ultimately resulting in a brand strategy (116).

In order to harness the power of groups of individuals to focus on concepts or issues, often the various individuals will vote on the relative relationships and importance of these concepts or issues, and the software then segment the results according to voter preference. The software will often also provide additional insight into the problem at hand by segmenting the various voters by results.

In order to provide a very simple user interface, which encourages transparent decision making and both individual and group focus, it will often be useful to further encourage users to link the key concepts, issues or Data Points to suggestive images or icons. Although not obligatory to the invention, this linkage to relevant visual images helps engage the visual centers of the participants' brains, and helps prevent confusion and reinforce attention on the problem at hand. The use of images facilitates a deeper level of collective understanding after words and phrases have been chosen by engaging the visual parts of each individual participant's brain. For example, if the word is "pure" a picture of a distilled glass of water is very different than the picture of an innocent child and the interface allows a collective precise meaning for each word to be defined. The group will have chosen a set of top text ideas and then assign images to each idea, or the group will choose images and then assign text labels or text ideas to each image. It is noted that in rare circumstances, a combination of text and images will be used and then images and text labels will be assigned, respectively.

Figure 1B:
FIG. 1B shows an optional initial step in the process, which is giving the participants an array of images that may potentially relate to various issues, concerns, or features relating to the qualitative problem at hand, and requesting that the audience agree on a limited number (such as 10) of most important issues, and assign a suggestive image and title to these most important issues.

FIG. 1B shows an optional initial step in the process, which is giving the participants an array of images that may potentially relate to various issues, concerns, or features relating to the qualitative problem at hand, and requesting that the audience agree on a limited number (such as ten) of most important issues, and assign a suggestive image and title to these most important issues.

Figure 1C:
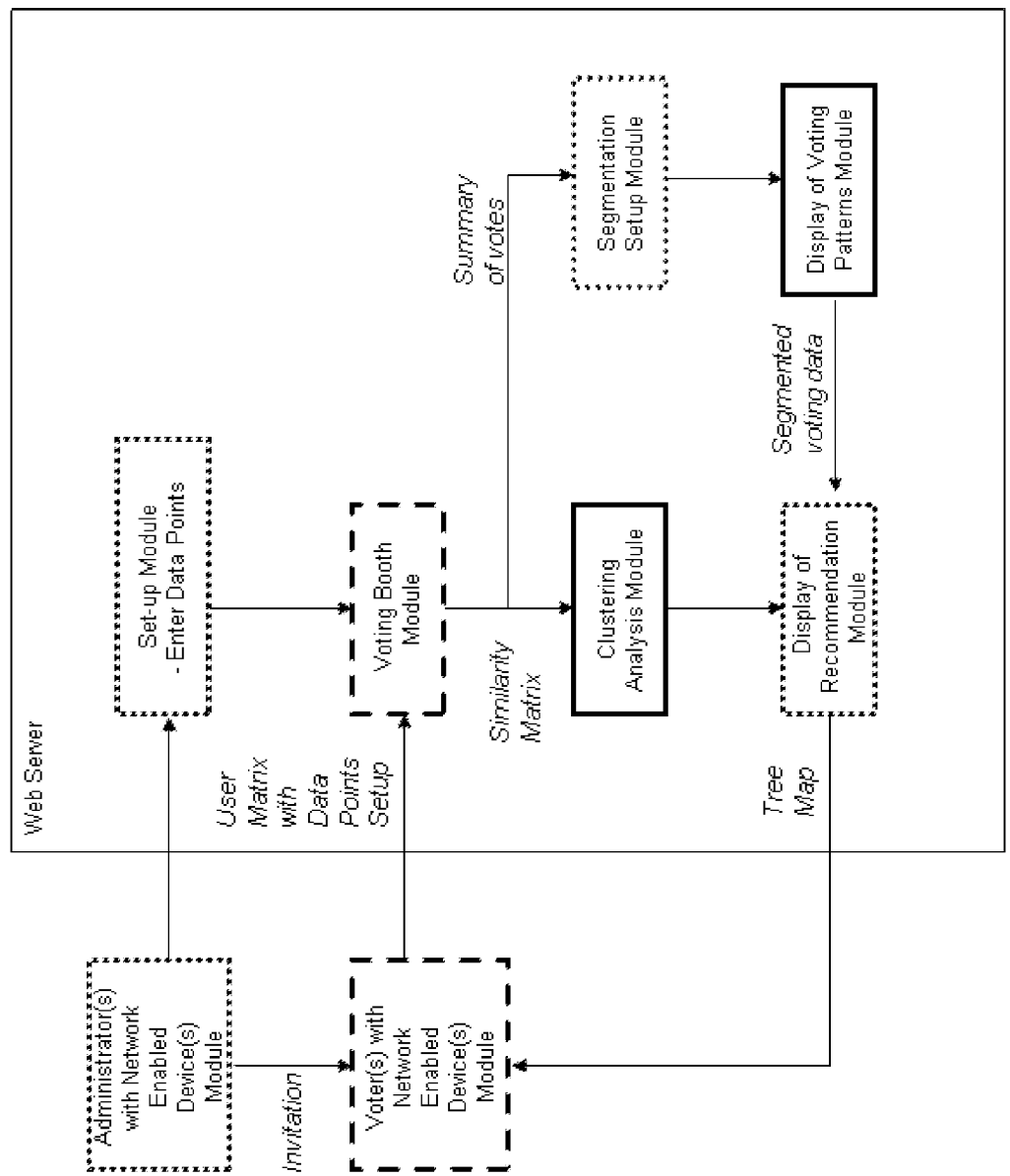
FIG. 1C shows a flowchart for the collaborative clustering process and software.
Figure 1C:
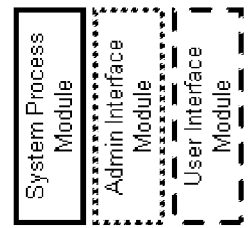

Here, this type of method will be termed a "collaborative clustering process", and a flow chart of one embodiment of this process is shown in FIG. 1C, and according to the invention, many or all steps of this process may be implemented in software, normally running on networked server systems, often communicating over either local networks or through larger networks such as the Internet.

In the specific embodiments and examples discussed herein, exemplified by the modules shown in FIG. 1C, the Project Console and Voting Booth programming examples were web applications that were custom built on a RubyOnRails framework. These were run on a RackSpace Cloudserver CentOS, Apache, and MySQL. The Clustering module was a custom single-linkage clustering module built in the Ruby programming environment. The Cladogram and Dendrogram viewers were custom built using Adobe Flash AS3; and the data feed from the Project Console as XML. Other software systems and methods may also be used as desired.

In one embodiment, the invention may use modular data collection, pre-processing, core processing, post processing, and output approach to quickly and economically support the decision making process. The invention software will typically use hierarchical clustering algorithms to identify relationships between data elements (i.e. the concepts or issues, again usually identified with an image and short text description to facilitate user interaction). The invention software and method will typically use binary comparisons to generate objective data from subjective input data, and use images to assist in the (human) semantic conversion of data elements. The software and method will usually also use individual prioritization of data elements to assist with group prioritization, as well as use one or more types of graphical output display to help users visualize relationships. In order to avoid undue influence by a few real or self-appointed group leaders, the system will often use anonymous participation to remove group influenced biases during voting process.

This type of approach has a number of distinct advantages. The anonymous participation feature can help prevent or at least reduce the level of individual and group input bias, as well as help prevent prioritization bias.

The software also is scalable to large numbers of participants; helps significantly speed up the execution of the decision process, and helps maximizes the objectivity of the prioritization. The software also keeps track of each step of process, allowing users to review at anytime, and also allows the results from different sessions to be analyzed between sessions.

Often, it will be useful to implement the methods of the invention in the form of multiple software modules. These modules can include I) an initial setup module, II) a voting booth module, III) a module to summarize the individual voting results into a similarity matrix, IV) a clustering analysis module, V) a recommendation display module, and VI) a voting patterns analysis module. This voting patterns analysis module can, in turn analyze the various votes according to a) voting patterns analysis, b) comparison between individual user voting results matrix with the overall similarity matrix, and c) also analyze voting results on pre-defined groups. The function of these various software modules are described below.

Part I. Initial Setup Module

In one embodiment, the software will allow a user designated as an Administrator to log in, and present the Administrator with a list of previously executed projects. When the Administrator drills down on each project, a history of results from previous runs will be listed, each drilling into the results of each run. Typically each individual Administrator will have their own logins, but different Administrators in the same organization or division will often be able to share access to the projects list as authorized.

From the projects list, the Administrator can then select and launch a new voting project by entering and uploading relevant information for the project. Alternatively, the Administrator may choose a previously run project to launch an additional run. The Administrator may additionally be able to set a timer for the length of time the project is allowed to run for.

In order to simplify the user interface for the system, often it will be useful, as a preliminary exercise, to first have the group identify analyze the problem and select a relatively small number of concepts or issues, such as the top ten concepts or issues, to focus on. In some implementations, this initial analysis and identification will be done by the same group of people who later identify the top ten issues or concepts, and in other implementations this may be done by a different group of people. As previously discussed, to improve ease of visualization, often these top ten concepts or issues will be represented by images that symbolize that specific concept or issue, as well as a short text phrase or label that also identifies the concept or issue. This approach greatly simplifies the user interface, and makes it easier for larger groups to maintain a group focus on the problem. Again, these labeled images will be termed "Data Points".

In some embodiments, it may be useful to first identify the top issues, such as the top ten issues, by a preliminary process that initially is based on a much larger issue list. This preliminary and optional "winnowing down" method may be performed by another computer implemented method, either as a stand-alone program, or as a program module integrated into the computer programs that implement the other aspects of the invention described herein. For example, each user may be provided with a much larger list of potential top issues on a computer screen, for example a scrolling list, which may be implemented in on a touch sensitive screen for ease of use. The user may be invited to pick his or her top eight or ten issues from this larger list. This computer generated list can also allow the user to get further information as to a more precise definition of that particular potential top issue. The participant may then optionally be presented with the popularity ranking data from the overall team as well. Then, after each participant has made this initial selection, the system administrator or facilitator may be presented with a summary screen that rank orders the various issues in terms of frequency of selection. The numeric ranking of the frequency of selection may also be presented. The facilitator may then view the summary scores, demote issues with fewer votes, and/or edit the various issue names and definitions as appropriate. The facilitator may also add issues and definitions to this summary list as appropriate. This process can then continue in an iterative manner with the participants getting the facilitator adjusted issue list, selecting and voting again as appropriate, until a final list of issues that will ideally have multiple votes for each issue is presented to the participants.

In this discussion, it is assumed that by one process or another, at a group consensus has been obtained as to what the most significant issues are or may be so as to narrow down the number of choices to a reasonable number, which again is often around ten.

Continuing, in one embodiment, the software will prompt the Administrator to enter or transfer the names of about ten top Data Points (here assumed to be previously derived) for the project. Here a simplified software user interface, such as a graphical user interface, may allow the Administrator to easily manipulate the symbolic images and text of the roughly ten most critical issues or points by intuitive methods, such as dragging-and-dropping images from an online image gallery (e.g. FIG. 1B) to the associated Data Points. Often these symbolic images and text may be designated by Universal Resource Locators (URLs), and the software application may store the public URLs of the dropped-in images for a subsequent voting display. Additionally, to facilitate group interactions, the software may optionally also prompt to the Administrator to send email or social media invitations to various pre-determined voters (i.e. voters, group members, users or participants).

Figure 2A:
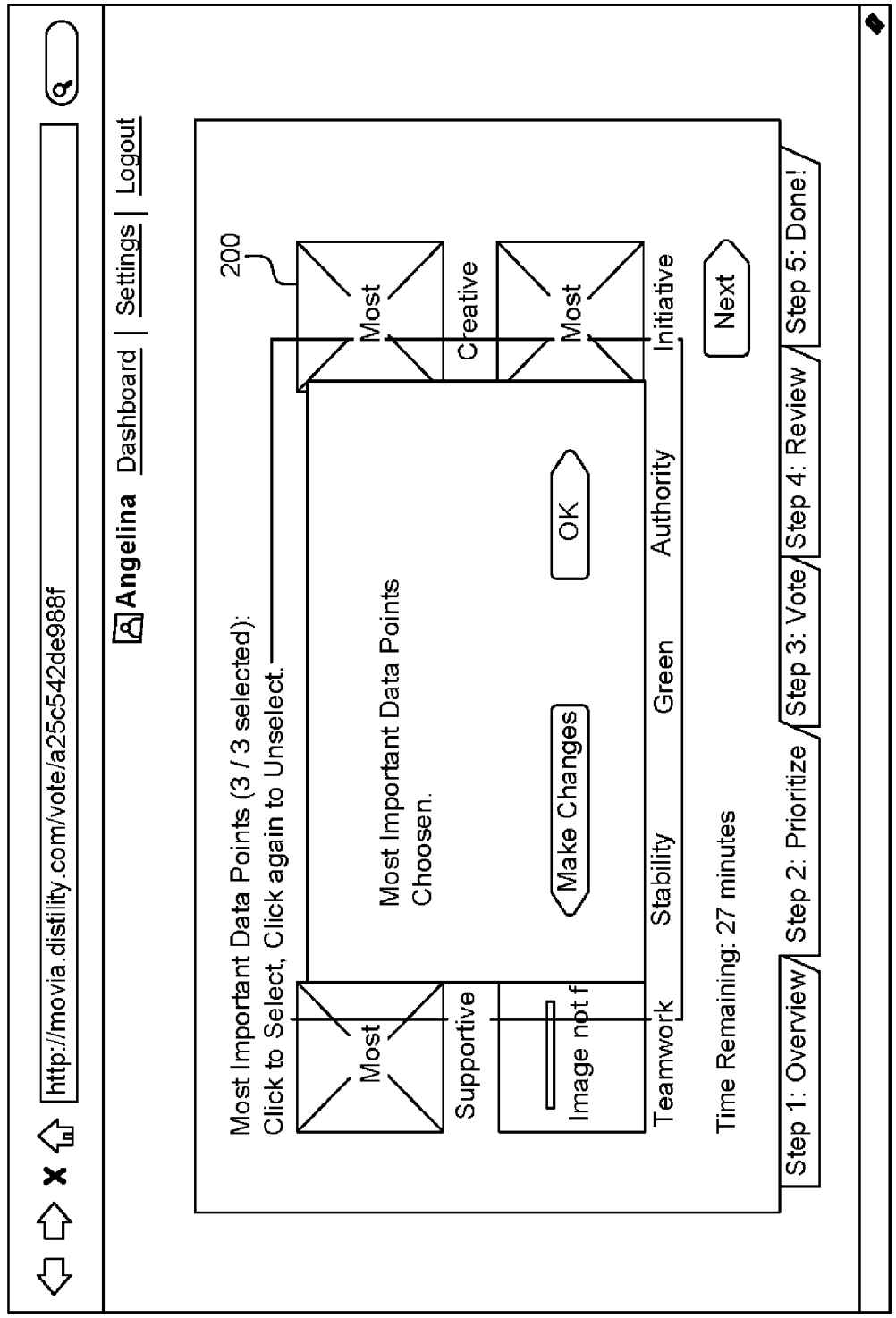
FIG. 2A shows a mockup of the software user interface for prioritization

Part II. Voting Booth Module: The voting module will often begin in a starting state that presents all of the top selected Data Points. Typically each user (group member, voter) will then rate each Data Point based on their assessment of the Data Point's level of importance in relative to the other Data Points. However to prevent users from voting all Data Points as "important", the voting module software may enforce preset constraints as to what percentage of the Data Points may be rated into one or more importance categories. This process is shown in FIG. 2A, which shows an abstracted version of a user prioritization user interface. Here the various boxes marked with an "X" (200) indicate the various images and text that are used to symbolize the various concepts or issues that are being analyzed by the group. In some embodiments, the software may additionally allow the Administrator to enter various objectives such as "core brand essence" or "concept" to help ensure that all users are using the same importance ranking scheme.

Figure 2B:
FIG. 2B shows screen shots from two different users who are each voting on the relative importance of the top ten issues. User one (top) is partway through the process, but has still not assigned two issues (gives base plan, unlock treasure) as to importance. User two (bottom) has finished the process. Although there is some agreement between the assignments as to importance, the two votes are not identical.

Real examples for a simplified two voter analysis are shown in FIG. 2B, FIG. 2B shows screen shots from two different users who are each voting on the relative importance of the top ten issues. User one (top) is partway through the process, but has still not assigned two issues (gives base plan, unlock treasure) (202) (204) as to importance. User two (bottom) has finished the process. Although there is some agreement between the assignments as to importance, the two votes are not identical.

Figure 3A:
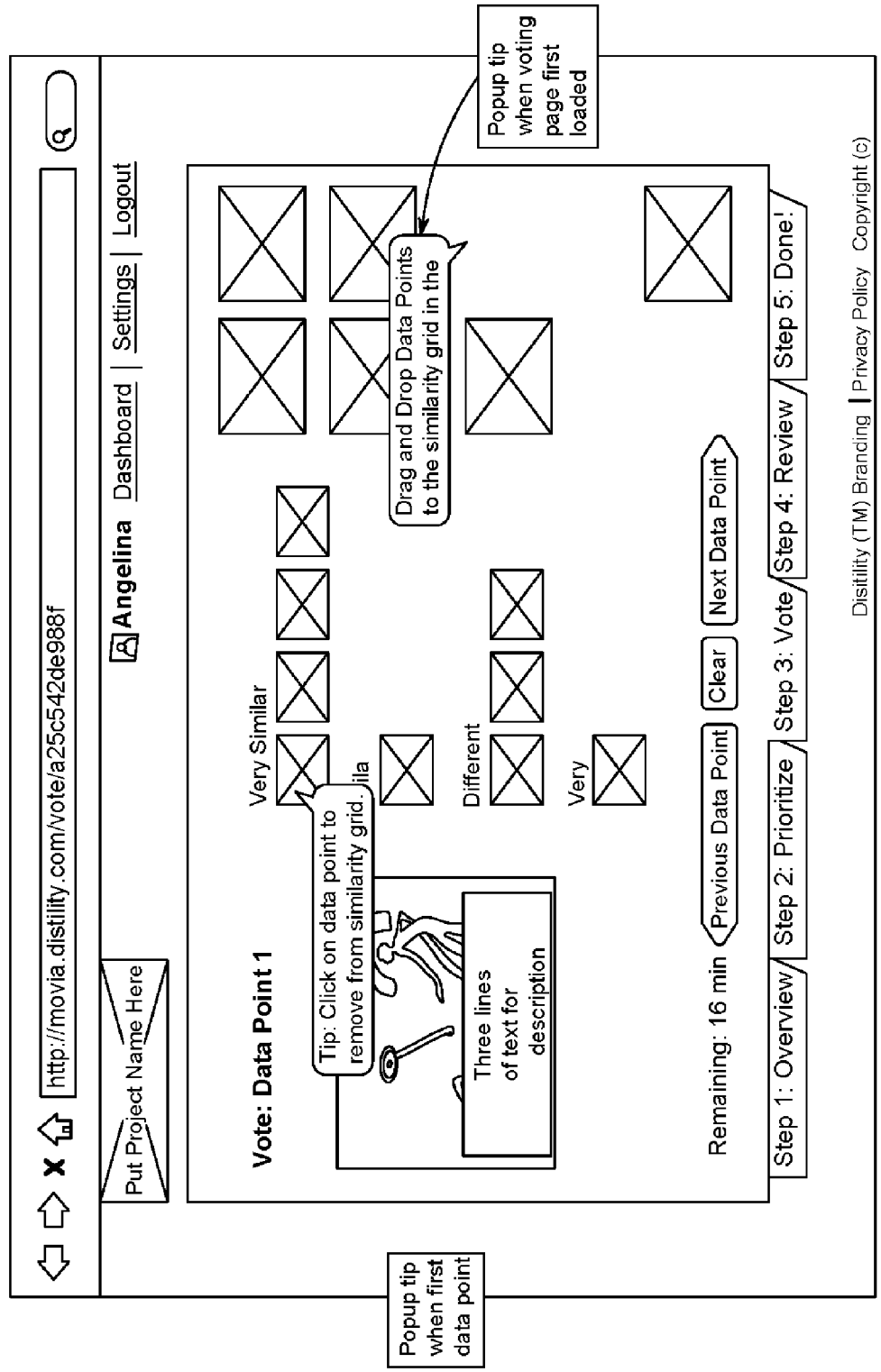
FIG. 3A shows a mockup user interface for the voting process where users rank the top 10 issues or concerns or features as to similarity.

After the relative importance of the various concepts or issues are determined and ranked by the group, the next step is to determine which of the various concepts or issues are really unique, and which are really just alternate ways of stating or looking at the same concept or issue. To do this, the users will then vote to rank the various images and text according to degrees of similarity, such as very similar, similar, different, very different, and so on. Each user will make this determination on their own user interface, and the system will again accumulate group statistics. This voting process is shown in FIG. 3A. FIG. 3A shows a mockup user interface for the voting process where users rank the roughly top ten issues or concerns or features as to similarity.

Thus FIG. 3A shows an abstraction of a graphical user interface that the system may present to facilitate the voting process. In order to improve usability, the interface may allow users to skip to the next Data Point or go back to change their rating at anytime during the process. Group decision making processes can often be bogged down by users that take too much time to think, and to prevent this, the system may additionally show the time remaining and remind the individual user when it is close to the end. Often various other time management schemes, such as showing the three most important Data Points first, will be used to make sure that users have enough time to rate at least the most important Data Points.

Figure 3C:
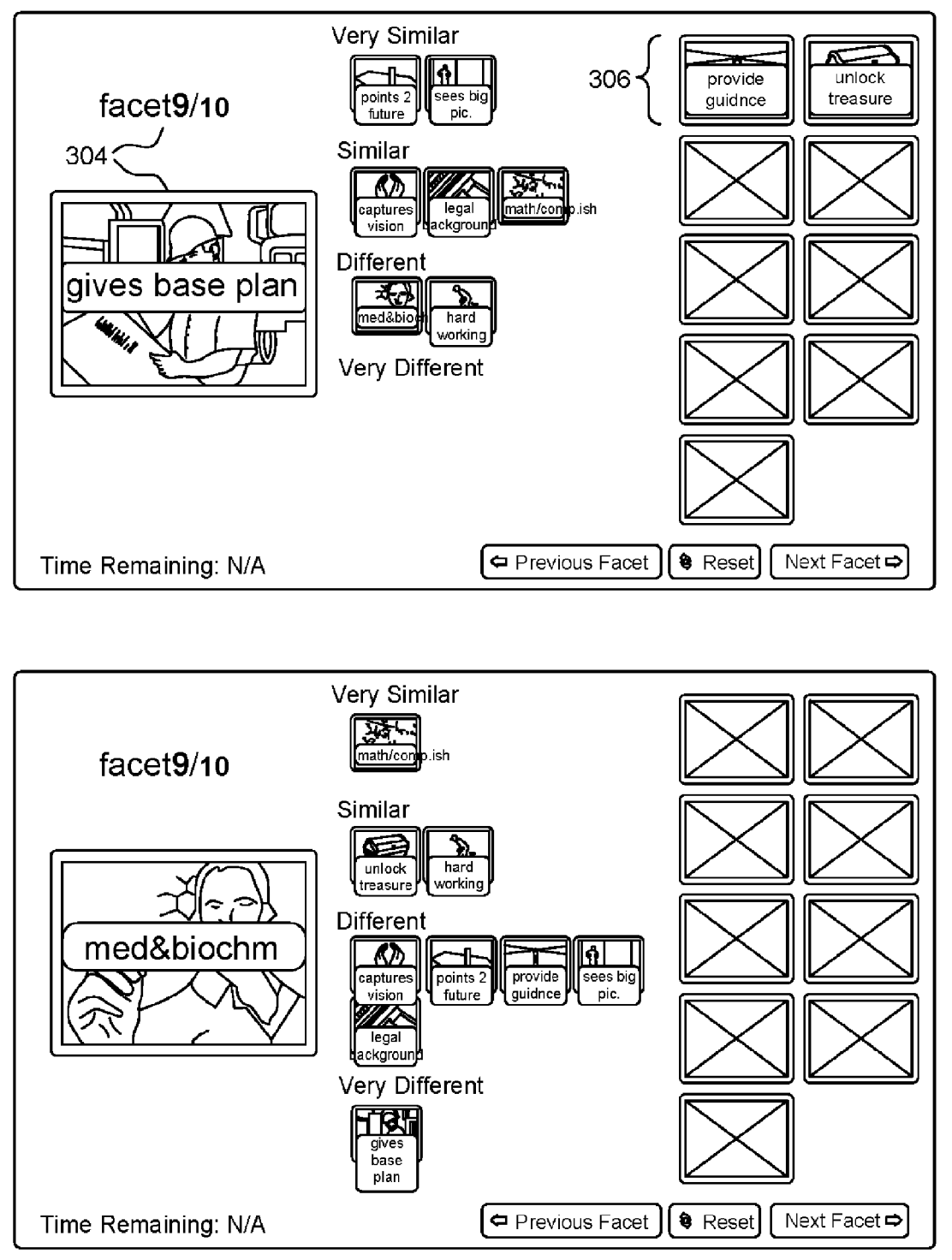

Real examples for a simplified two voter analysis are shown in FIGS. 3B and 3C. FIG. 3B shows screen shots from two different users who are each voting on the relative similarity between the top ten issues. Here the first issue or Data Point (300) is being voted on. Note that this first issue or Data Point "Captures vision" was previously assigned by both voters as being extremely important. User one (top) is partway through the process, but has still not assigned four issues (gives base plan, unlock treasure, provide guidance, med& biochem.) (302) as to similarity. User two (bottom) has finished the process. Again, although there is some agreement between the assignments as to similarity, the two votes are not identical.

FIG. 3C shows screen shots from two different users who are each voting on the relative similarity between the top ten issues or Data Points. Here the $9^{th}$ issue (304) is being voted on. This $9^{th}$ issue or Data Point was previously rated as very unimportant by user one, and thus had an overall lower average importance rating. User one (top) is partway through the process, but has still not assigned two issues (unlock treasure, provide guidance) (306) as to similarity. User two (bottom) has finished the process. Again, although there is some agreement between the assignments as to similarity, the two votes are not identical.

Figure 4:
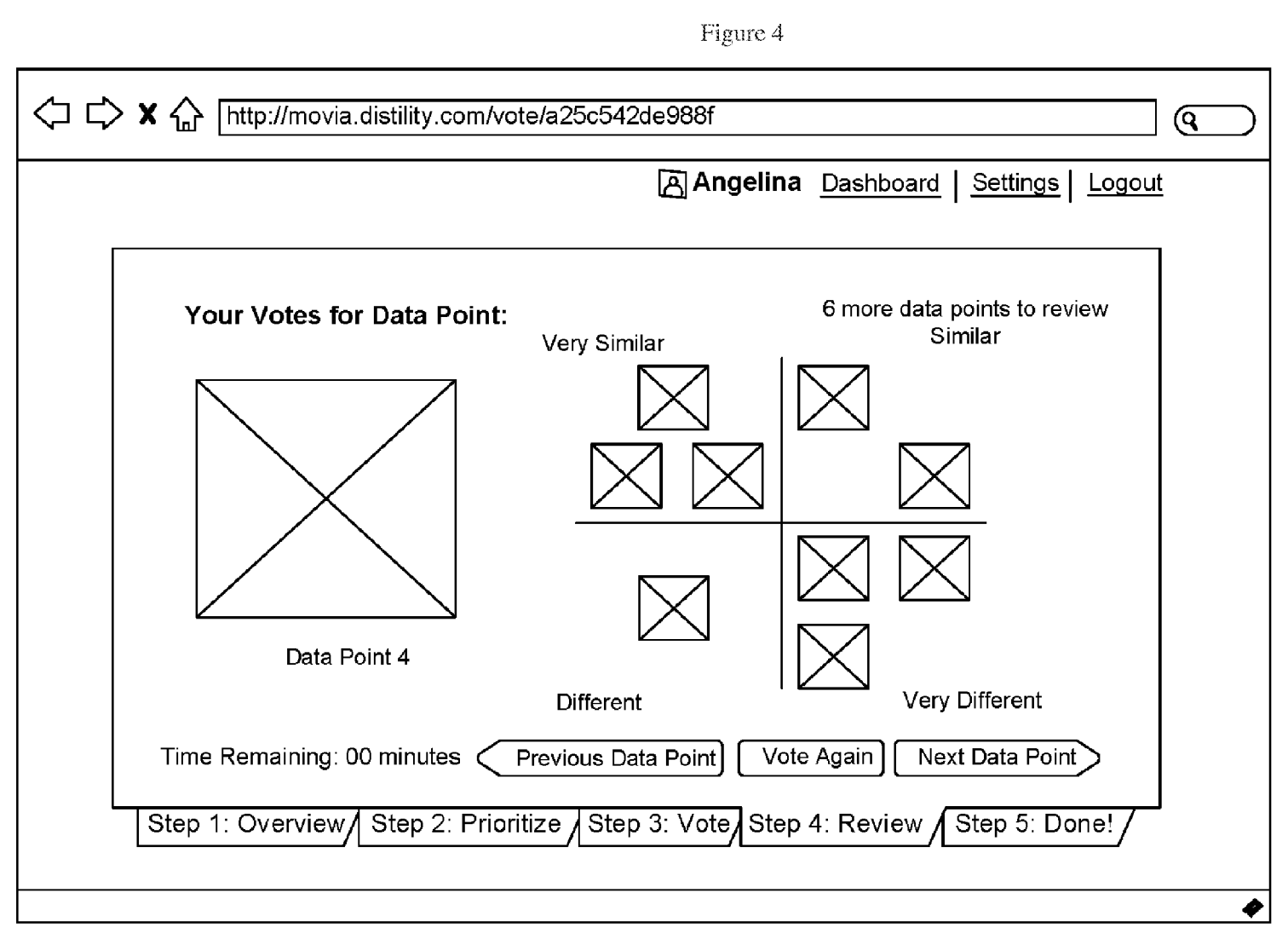

When the voting process is completed, the system will then generate a graphical user interface that summarizes the individual user's vote, and this is shown in FIG. 4.

FIG. 4 shows an abstract view of the user interface that summarizes that individual user's particular voting results. Again the boxes with "X" inside represent the images and descriptive text used to symbolize the concepts or issues being analyzed. In order to insure accurate results, usually the system will allow the users to examine this display, and allow the user to make final changes by suitable dragging and dropping operations. In some embodiments, to help ensure good user input data, the software may warn the user if, for example, over 70% of the Data Points are rated 'similar'.

The data from multiple numbers of users, minimum of one, normally at least two, and often ten or more users, are then analyzed by the various matrix methods described below. In general, more users are better, and there is no upper limit on the maximum number of users that may be analyzed using these methods.

In some embodiments, the program will create a user matrix based upon a rating scale range, such as −2 (most dissimilar items or concepts) to 2 (most similar items or concepts). Often this particular scale will be fixed regardless of the number of Data Points and/or users being analyzed.

The software will typically create an N×N matrix for each user, where N is the number of Data Points selected. Thus, for example, if ten concepts or items are being analyzed by the group, and these items or concepts are represented by ten images and associated text, the N×N matrix will be a 10×10 matrix, where each row or column will represent a different concept or item, again referred to here as a "Data Point". The rating results of each user will be stored in their own matrix. This is shown in FIG. 5.

By default, all cell values in this matrix may initially be set to zero (which means the Data Point pair is neither similar or dissimilar), with the exception of the diagonal cells, since obviously any one given concept or item "Data Point" will be maximally similar to itself, and here maximal similarity is given a value of "2".

Note that although this user matrix will be used to store rating results from a particular user, in order to preserve a simple user interface, this matrix will not usually be displayed to the user. Rather, the users will normally use a different type of interface to compare the Data Points, which will be discussed shortly in the part 2 voting booth module discussion.

The 10×10 matrix in FIG. 5 shows how the matrix should look like in the beginning of the rating process. In this example the matrix is created for clustering analysis of 10 Data Points.

Once the user started rating each Data Point pair, the corresponding cell values in the user matrix will be updated at the same time. As previously discussed, the values associated with each rating may be assigned as follows in Table 1 below.

TABLE 1

Similarity ratings

| Data Point Pair Rating | Cell Value |
|---|---|
| Very Similar | 2 |
| Similar | 1 |
| Dissimilar | −1 |
| Very Dissimilar | −2 |

In order to force decision making, in some embodiments, a user may not be allowed to vote neutral, however, a user can choose not to rate a particular Data Point pair.

For example, if the user rated Data Point 1 and Data Point 2 as similar, the value in the corresponding cells will change from zero to one.

To check the data, the system will recognize that the valid cell values will be −2, −1, 0, 1, and 2 only, if a user did not finish the rating process in the given time period. When this happens, the cells corresponding to those Data Point pairs will remain zero by default.

Note that the user matrix is a symmetric matrix so the cell values are symmetric with respect to the main diagonal (top left to bottom right).

Part III. Summarize Individual Voting Results into a Similarity Matrix

Once all of the user matrices are filled, the software will then usually summarize the values into a similarity matrix by a simple summation operation where the value in any summation matrix cell i, j, is simply the sum of the individual user matrix cell i, j values. For example, in a circumstance where the voting results for two users (User A and User B) are being analyzed by the system, then the user matrixes of the two can be added or summed together, as is shown in FIG. 6. Note that although for many applications, it is preferable to work with the voting results from multiple users; a single user can also use the system as desired.

Thus in a similarity matrix, the value in each cell is equal to the sum of the corresponding cells in the various user matrices. The diagonal cells will have a value that is equal to the total number of users multiplied by two. If, in the above example, User A gave a rating of one (i.e. similar) for Data Point A and Data Point B, while User B gave a rating of two (i.e. very similar) for Data Point A and Data Point B, then the corresponding cell in the similarity matrix will be: 2+1=3. This is shown as the circled cells in FIG. 6.

Thus the minimum and maximum values allowed in a similarity matrix should be: minimum is: −2*number of users, and maximum is: 2*number of users Any values outside of this minimum and maximum range would thus be considered as invalid values. This overall similarity matrix may then be used by the software to perform a clustering analysis, as described below.

FIG. 7 shows part of the actual similarity matrix produced by the users who were previously voting in FIGS. 2B, 3B, and 3C.

FIG. 8 shows a sample user similarity matrix of nine users.

Part IV. Clustering Analysis Module

In prior art clustering analysis, the data set was often constructed in a way that the observations (rows) are different than the variables (columns). The variables were then used to describe the observation, instead of showing the relationship between observations. Then the data set would usually then be converted to a distance matrix which would display the distance or closeness between the observations.

According to the invention, however, since we begin with building a similarity matrix, which in a way is already the 'distance' between Data Points, therefore we can skip the conversion step and instead use the similarity matrix itself as the distance matrix for the clustering process.

This process of hierarchical clustering can be defined by the following steps:

1. Assign each Data Point to a cluster, each cluster containing just one Data Point (thus a matrix with N Data Points should have N clusters to begin with). Let the distances (similarities) between the clusters be the same as the distances (similarities) between the Data Points they contain.
2. Find the closest (most similar) pair of clusters and merge them into a single cluster.
3. Compute the distances (similarities) between the new cluster and each of the old clusters. This can be done using single-linkage, average linkage and complete-linkage
4. Repeat steps 2 and 3 until all items are clustered into a single cluster of N Data Points.

EXAMPLE

Suppose we have summarized the user ratings into the similarity matrix as shown in FIG. 8.

For the ease of calculation, we will transform the values in this similarity matrix to show the similarity in a positive, scale. The formula for transformation is:

$-1*(X_{ij}$−maximum cell value), where $X_{ij}$ is value of row $i$ and column $j$, $i\in(1,N)$ and $j\in(1,N)$, $N$ is the total number of Data Points In our example, the maximum cell value is Total # of Users*2=>9*2=18. This transformed matrix is shown in FIG. 9, which shows the similarity matrix transformed to a positive scale.

In the transformed similarity matrix, the smaller values represent more similar Data Points, while the larger values represent more dissimilar Data Points. The closest (i.e. most similar) pair of Data Points in this example are Data Point 1 and Data Point 10, with a rating of '1'. They are merged into a new cluster called "Data Point 1/10". The level of the new cluster is thus L (Data Point 1, Data Point 10)=1 and the new sequence number is m=1.

Then we compute the similarity from this new compound Data Point to all other Data Points. In single-linkage clustering, the rule is that the similarity from the compound Data Points to another Data Point is equal to the most similar rating from any member of the cluster to the outside Data Point. So the similarity rating from "Data Point 1/10" to "Data Point 2" is 8, which is the similarity rating between Data Point 10 and Data Point 2, and so on.

After merging Data Point 1 with Data Point 10 we obtain the matrix shown in FIG. 10, which shows the Single linkage hierarchical clustering—first iteration.

The process then continues to find the next most similar pair. Here we have MM d(Data Point 1/10, Data Point 8)=1, therefore we will merge Data Point 1/10 and Data Point 8 into a new cluster.

We (the software algorithm) then continue to find the next most similar pair of Data Points. Thus we have Min d(i,j)=d (Data Point 1/10/8, Data Point 6)=2, therefore we will merge "Data Point 1/10/8" and "Data Point 6" into a new cluster.

Next, Min d(i,j)=d(Data Point 4, Data Point 9)=2, therefore we will merge Data Point 4 and Data Point 9 into a new cluster.

Next, Min d(i,j)=d(Data Point 4/9, Data Point 7)=3, therefore we will merge Data Point 4/9 and Data Point 7 into a new cluster.

Next, Min d(i,j)=d(Data Point 2, Data Point 5), 3, therefore we will merge Data Point 2 and Data Point 5 into a new cluster.

Next, Min d(i,j)=d(Data Point 4/9/7, Data Point 2/5)=6, therefore we will merge Data Point 4/9/7 and Data Point 2/5 into a new cluster.

Next, Min d(i,j)=d(Data Point 2/5/4/9/7, Data Point 1/10/8/6)=7, therefore we will merge Data Point 2/5/4/9/7 and Data Point 1/10/8/6 into a new cluster.

Figure 11:
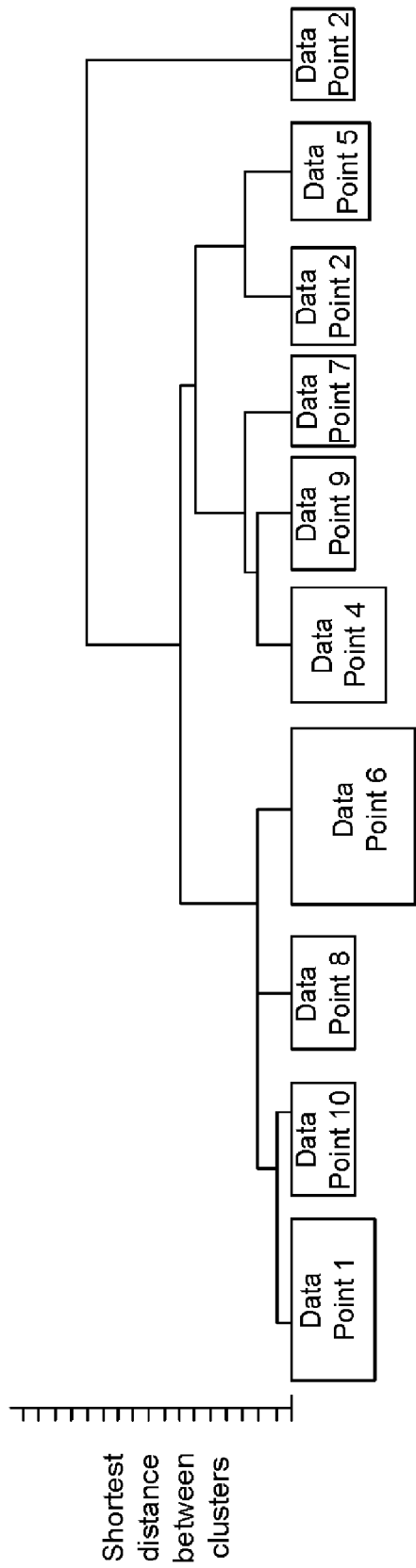
FIG. 11 shows a sample display of a treemap.

Finally we will merge the last two clusters together and summarize the clustering results into a hierarchical tree (or treemap, FIG. 11). This treemap is discussed in more detail in the part V recommendation module, discussed below, Part V Display of Recommendation Module:

The Administrator (and the users as well as desired) can view the clustering results in different graphical display formats such as treemap (also known as a dendrogram), mindmap, heatmap, nodal plot, and other graphical representations.

In some embodiments, it will be useful to select the treemap graphical output mode to be the first (default) output that is graphically shown to the Administrator and optionally the users. If the software is being used in an interactive group setting, then the Administrator can then discuss the clustering results with the various users, using the treemap output as a convenient graphical display. Based upon group input, the level of significance of the various tree settings can be assigned, and various threshold cut-offs can be refined based either upon group discussion, or on preassigned algorithms as desired.

After discussion is over, the Administrator will enter the necessary threshold cutoff information to the system, or alternatively the system may do this automatically. The system may then display the recommendation with Data Points organized in pillars as indicated.

FIG. 11 shows an abstracted example of the treemap output. In this embodiment, the horizontal axis may display all of the data points (i.e. issues, concerns) involved in the process. In order to improve the usability of the treemap user interface, the data points (issues, concerns) that were voted by the group to be more important than the other data points (issues or concerns) may be represented by bigger boxes (i.e. the image symbolizing that particular issue or concern will be made larger), and the system will also weight these higher voted data points (issues or concerns) higher as well.

Alternatively other methods of priority visualization may also be implemented. For example, in alternative schemes, instead of designating priority by box size, other types of graphical methods may be used. For example, a priority score may be inserted in the corner of each image/text issue, or other graphical index such as number of stars (group favorites) may be employed, in some embodiments, the system may automatically judge when certain selections are clear winners, when all are rated about the same, or clearly show the least important issues.

Figure 12A:
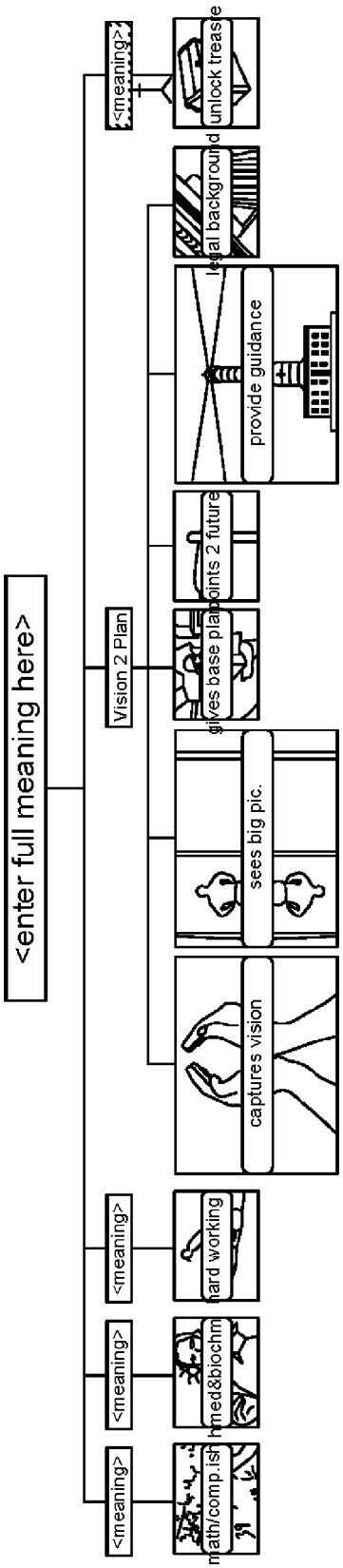
FIG. 12A shows the actual treemap produced by the users who were previously voting in FIGS. 2B, 3B, and 3C, and who produced the actual similarity matrix shown in FIG. 6.

FIG. 12A shows the actual treemap produced by the users who were previously voting in FIGS. 2B, 3B, and 3C, and who produced the actual similarity matrix shown in FIG. 6. As can be seen, the images that correspond to the issues, concepts or Data Points considered most important by the two users are shown as larger images than the less important issues, concepts, or Data Points.

In addition to image size, other graphical methods for visual identification, such as numeric ratings or use of a color scale may also be used to show the average level of similarity, as determined by group consensus. Thus, for example, Data Points that are more similar to each other may be displayed in darker color, and Data Points that are less similar to each other may be displayed in lighter colors.

Figure 12B:
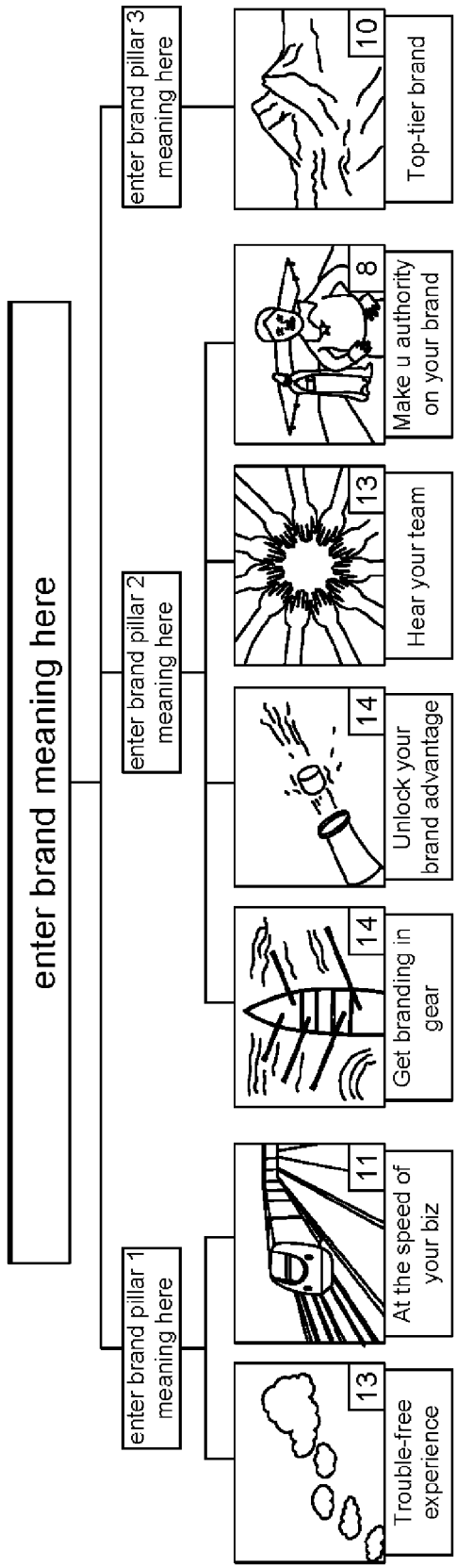
FIG. 12B shows an alternate type of treemap for a different analysis. Here the relative importance of the various ratings is indicated by a numeric score in the lower righthand side of the various images.

Alternatively, concepts or data points considered most important can be simply be shown by a numeric indicator on the images that correspond to the issues, concepts, or Data Points. This alternate method (here for a different analysis) is shown in FIG. 12B.

In FIGS. 11 and 12A, the vertical axis represents the distance between clusters. As was discussed in Part 4—Clustering Analysis Module, distance is computed during the clustering process. The definition of distance between clusters various depends on the method of calculation used. For single-linkage method, distance between two clusters may be defined by the closest similarity rating between them.

Continuing with the invention's user interface, in the tree map, the height of a branch may represent the distance between two clusters. Thus in the example tree map, the "height" between Data Point 1 and Data Point 10 is 1 and the height of Data Point 4/9/7 and Data Point 2/5/3 is 7.

Figure 13:
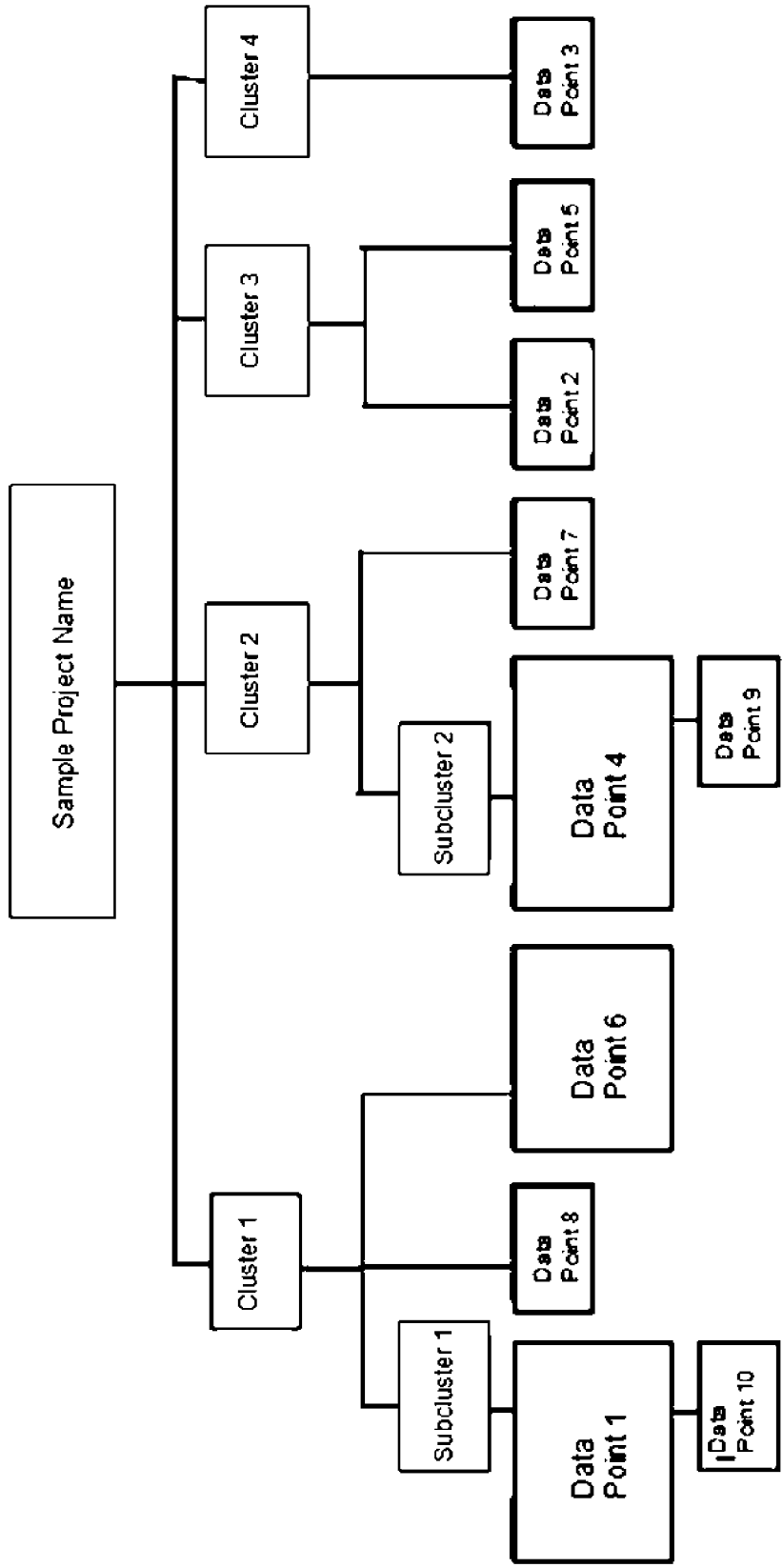
FIG. 13 shows a sample display of a clustering recommendation

This user interface may be used by the Administrator, the various users, or in a conference setting, by a conference facilitator and participants to extract further meaning from the analysis. Here the "height" on this user interface is a very good predictor of how easy or hard it will be to name a cluster. This is because if all the ideas are really very similar, we are looking at almost the same idea. If the ideas are very different, then likely the idea will probably need more discussion in order to understand and interpret the result. An example of the user interface display is shown in FIG. 13.

Figure 14:
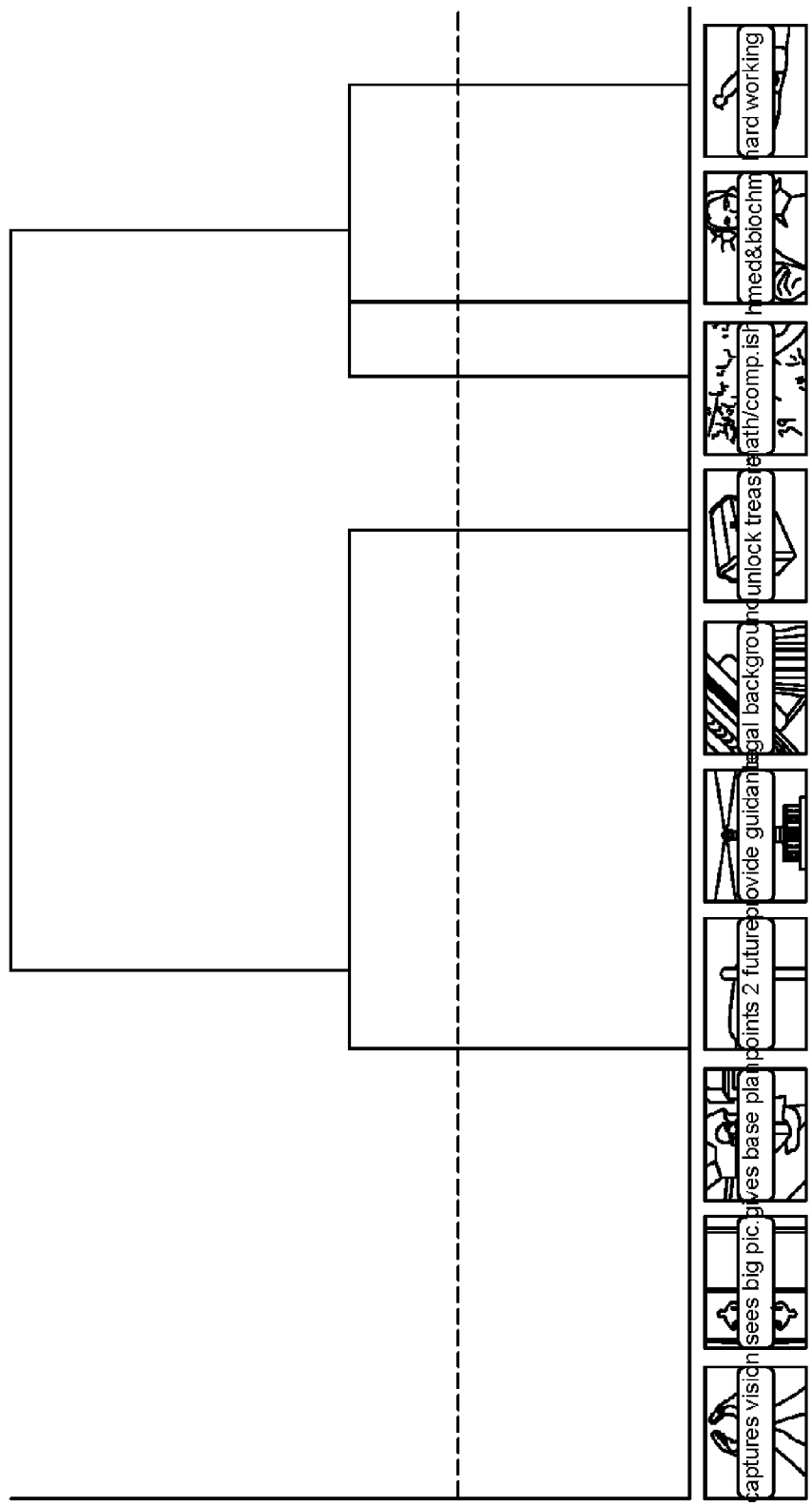
FIG. 14 shows the actual clustering recommendation diagram produced by the users who were previously voting in FIGS. 2B, 3B, and 3C, and who produced the actual similarity matrix shown in FIG. 6, as well as the actual treemap shown in FIG. 12A.

FIG. 14 shows the actual clustering diagram produced by the users who were previously voting in FIGS. 2B, 3B, and 3C, and who produced the actual similarity matrix shown in FIG. 6, as well as the actual treemap shown in FIG. 12A.

Figure 15:
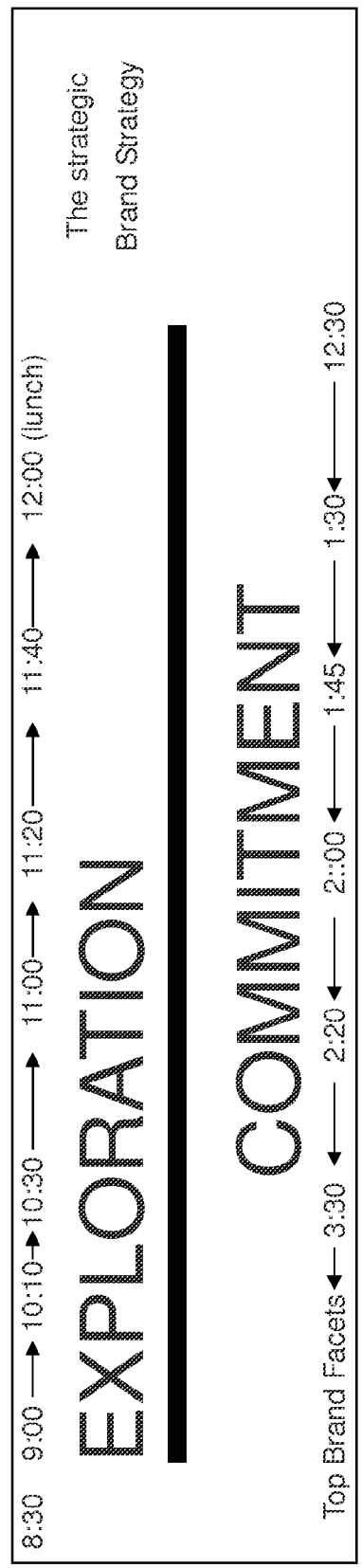
FIG. 15 shows how the entire process may be used to facilitate complex group qualitative decisions, such as product branding, and produce high quality results within a single day.

FIG. 15 shows how the entire process may be used to facilitate complex group qualitative decisions, such as product branding, to produce high quality results within a single day. Here either human facilitators, or alternatively automated wizard software can help move the process along by imposing time deadlines and providing supplemental help and assistance as needed, in some embodiments, such as when groups are assembled into a single room, it may be advantageous to use multiple high resolution image projectors or video screens or large format interactive display boards to keep a display of past steps in the process up on screen while work commences. The ongoing display assists facilitator to maintain group focus and motivation.

Part VI. Voting Patterns Analysis Module

In some embodiments, the system will also perform clustering on the user rating pattern and display grouping results to the Administrator and/or other users. This option allows different users to be assigned to different groups based on similarity of their rating patterns. For example, voting trends may show that men system users (voters) tend to have significant differences from women system users, or younger voters may have significant differences from older voters. In a branding context, for example, this information can be highly useful, particularly if the brand is being focused at certain specific consumer subgroups.

In some embodiments, the system will allow the Administrator to see the names of the users in each group, as well as the clustering results based on the specific user group. In other embodiments, specific names may be withheld to encourage candid voting and preserve user privacy.

This type of analysis may begin by extracting information from the various user matrices. Here each row in a user matrix represents the rating results of a Data Point versus the other Data Points. For each Data Point, the program may extract rating results (rows) from each user, and combine them into a single matrix. The column for Data Point X vs. Data Point X may be removed since the value is set to 2 by default (comparing to itself)

The system may then perform average linkage hierarchical clustering. After the analysis is completed, the system may then display an alternative tree map with users being categorized into different clusters.

The number of clusters we will get depends on a preset value or run time set value that may be varied according to the judgment of the system Administrator as to where best to "cut the tree".

In alternative embodiments, the system software may be set to automatically force the output to display only a preset maximum number of tree clusters/pillars. For example, the system may automatically force cluster output into a maximum of two, three or four different clusters. This cluster upper limit option allows the Administrator or team to visualize the data as a smaller number of easier to understand branches. This automatic cluster upper limit option is particularly useful when working with larger numbers of concepts and ideas (e.g. 40 ideas) which otherwise (without automatic cluster forcing) could lead to an overly large number of branches, which in turn would make it more difficult for users to use to understand and extract meaning.

In the case where the system does not automatically impose a preset upper limit on the number of the clusters, if we set the system to cut off the tree at half of the longest distance between any clusters, we will get four clusters in results. We may name each cluster from left to right (group 1, group 2, group 3, etc.). For example, we have the following grouping results after the clustering analysis for Data Point X:

Group1: User A, User B, User C, User D, User H
Group2: User E
Group3: User G, User F
Group4: User I This process may be repeated for the rest of the Data Points, and the system will keep track of the user groupings. After all the Data Points are analyzed, the system can then calculate the group a user most frequently belongs to (i.e. the mode). An example of such a table showing user grouping results for all Data Points and voter modes is shown in FIG. 16.

Here, the overall grouping results may be summarized as below:
Group 1: User A, User C, User D
Group 2: User B, User E, User H
Group 3: User F, User G, User I The system may then run cluster analysis on Group 1, 2, and 3 separately and display a comparison report on their clustering results.

For this analysis, the clustering process is similar to what we did previously for the overall cluster, but instead of combining the individual matrix of 9 users, the system may instead combine the individual matrix of users in Group 1 only (then do the same for group 2 and 3).

Figure 17:
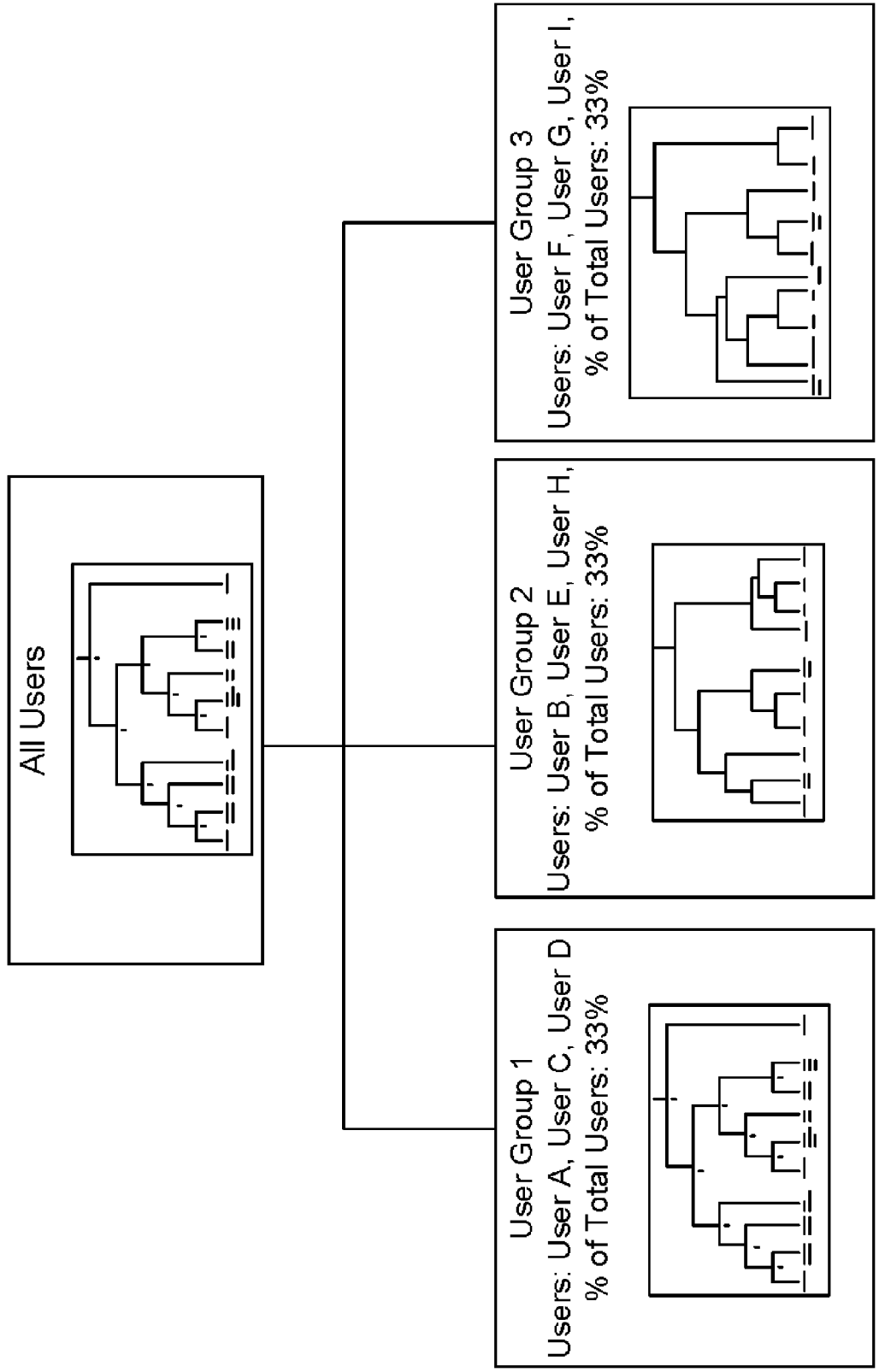
FIG. 17 shows a sample report of user grouping results

The overall clustering results may then be included in the display. If the program is being run in a group setting, the facilitator can then, for example, compare the difference between each user group and the overall results, as well as the difference between each user group. A sample report of such user grouping results is shown in FIG. 17. Note that in FIG. 17, the clustering results are only for display purposes, and are not actual data.

Voting Patterns Analysis Module Part B:—Compare Individual User Matrix with Overall Similarity Matrix More insight may also be obtained by comparing how individual user choices compare with the group averages. This can be done by first calculating the percent of similarity between the similarity matrix belonging to the user of interest, versus the overall group similarity matrix. The user's can then be grouped by percent of similarity, and a level of confidence rating generated. For example, this level of confidence can determine how different a user result is from the majority, as well as determining if we have a group divided into factions, or even if a particular user is an extreme outlier who perhaps should be discarded from the analysis. In some embodiments, the system Administrator may, for example, be able to see the names of the users in each group and the % of total users, and also determine segmentation—i.e. the relationship (if any) between voting patterns and types of users.

This analysis may also begin by comparing an individual user matrix with the overall similarity matrix. Here the idea is to determine the differences in cell values between the user and overall matrices. The program can pick any user to start. In this example shown in FIG. 18, we will begin with User A's matrix.

To do this, user A's matrix needs to be transformed to show similarity in a positive scale.

The formula for this transformation is:

$-1*(X_{ij}-2)$ Where $X_{ij}$ is value of row $i$ and column $j$, $i \in (1,N)$ and $j \in (1,N)$, $N$ is the total number of Data Points As before, in this example, the maximum cell value is 2, which is the maximum value allowed in a user matrix.

To compare User A's matrix with the overall similarity matrix shown in FIG. 19, we will need to transform the overall similarity matrix into a single user matrix.

For this comparison exercise, the formula for transforming an overall similarity matrix is shown as follows:

$-1*(\text{ROUND}(X_{ij}/N)-2)$ Where $X_{ij}$ is value of row $i$ and column $j$, $i \in (1,N)$ and $j \in (1,N)$, $N$ is the total number of Data Points In our example the overall similarity matrix combined the results from nine users. Here we will transform it to a single user matrix by dividing the cell values by nine, which is the total number of users participated.

Then the above formula will transform the matrix to show similarity in a positive scale.

Comparison Between an Individual User Matrix and the Overall Similarity Matrix

Now that both matrices have the some scale, we can compare each cell in the user matrix to the corresponding cell in the overall similarity matrix. The comparison results will be stored in a new matrix, called the Difference Matrix. If the two cell values are identical, the corresponding cell in the difference matrix will be zero. Otherwise the difference matrix cell value will equal to the absolute value of the difference between the two cells, The formulas are summarized as below:

If $X_{ij}=Y_{ij}$ then $Z_{ij}=0$

Otherwise if $X_{ij} \ne Y_{ij}$ then $Z_{ij}=\text{absolute}(X_{ij}-Y_{ij})$ where X is the individual user matrix, Y is the overall similarity matrix and Z is the difference matrix.

Here Row $i \in (1,N)$ and column $j \in (1,N)$, N is the total number of Data Points The difference matrix for user A's matrix vs. overall similarity matrix is shown in FIG. 20.

Here the percentage of similarity is calculated by the inverse of the sum of all cells divided by 2 then divided by total number of cells in the difference matrix.

% of Similarity=100%−SUM of cells in Difference Matrix÷2÷ Total Number of Cells in Different Matrix.

In this example, the sum of all cells in the difference matrix is 101 and there are 10×10=100 cells in the matrix so the % of similarity is:

100%−(101/2/100)=49%

This lets the Administrator and users know, for example, that the voting pattern of user "A" is 49% similar to the overall voting results.

The system will perform the same calculation to the rest of the users and summarize the results into a level of agreement report, shown in FIG. 21.

Figure 22:
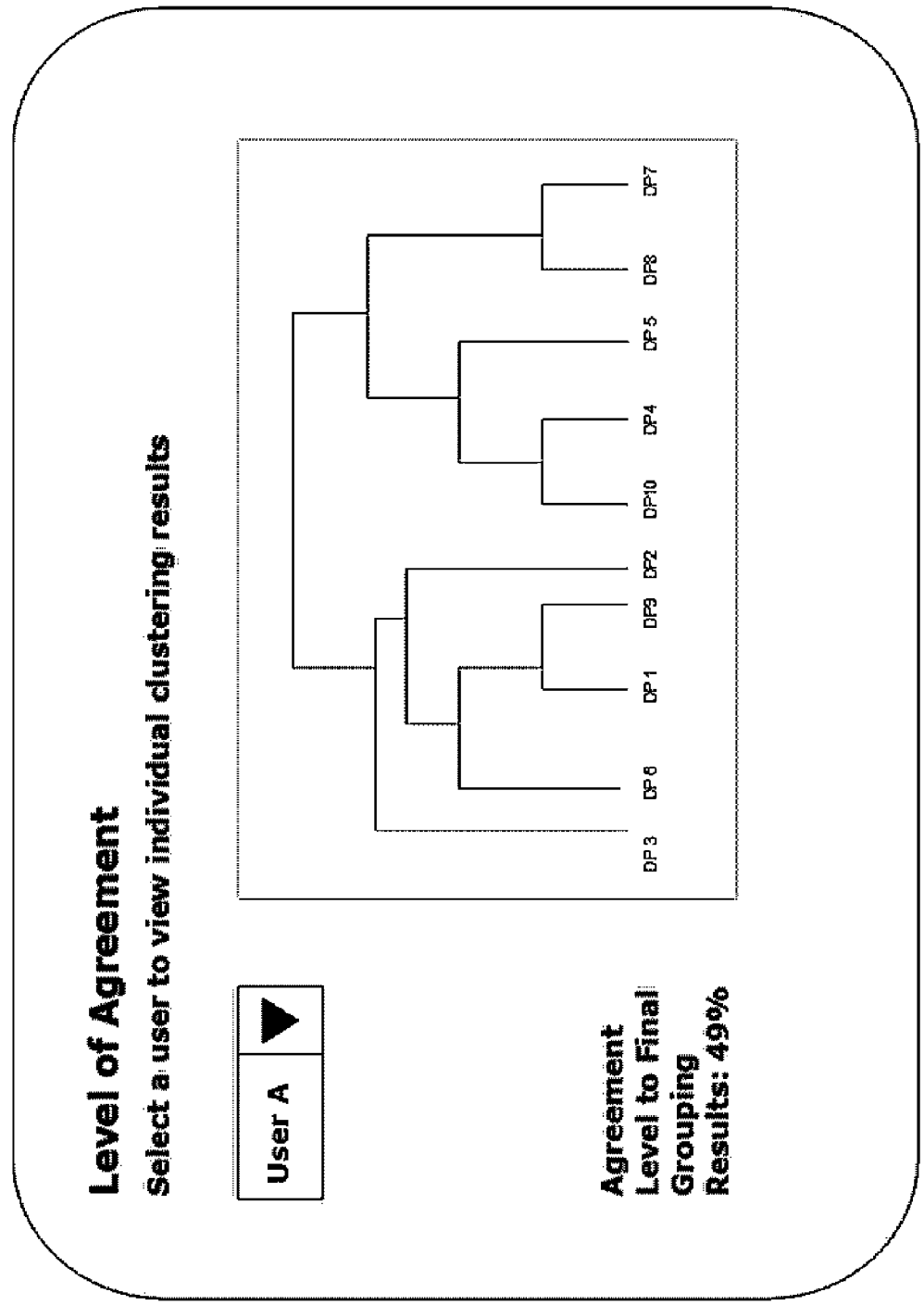
FIG. 22 shows a sample display of clustering results for an individual user.

Using this report, the Administrator can then drill down to view the clustering results for an individual user. This is shown in FIG. 22.

Part VII. Voting Patterns Analysis Module—Voting Results on Pre-Defined Groups (Optional)

In some situations, the Administrator might also want to know if users with different backgrounds have voted differently. In this optional embodiment, the system may ask the Administrator to enter the name and predefined values of the user parameters (e.g. age range, sex, department, etc.) in various preset groups When users log in to their voting booth, they will have to select the best description from a drop-down list user interface, such as one shown in FIG. 23.

For example, if we have the following pre-defined groups:

Group 1: User A, User C, User E, User G

Group 2: User B, User H

Group 3: User D. User F, User I

The system may then run clustering analysis for each group and display the results, such as those shown in FIG. 24. Here FIG. 24 shows a sample display of clustering results for a pre-defined age group.

In some embodiments, the Administrator may also have the ability to compare voting results side by side between different groups.

This function may also allow Administrators to run clustering on specific selected group(s). For example, if the Administrator has decided not to look at clustering results from the executive group (or if the executive group has locked out this function) but rather may just want to look at results from the marketing and customer service groups, then the Administrator can exclude executive and combine marketing and customer service together and rerun clustering.

Additional Features and Embodiments:

In addition to the previously described software features, additional software features may be added to the system as desired. Some of these additional features include:

1. Addition of third party participation input of Data Points.
2. Addition of third party participation in clustering Data Points.
3. Addition of alternative clustering methodologies.
4. Addition of alternative semantic data conversion methodologies.
5. Addition of input of Data Points as sounds, scents, 3D images, moving images and/or physical objects.
6. Addition of result display methods.
7. Addition of alternative analysis methods of voting patterns.
8. Addition of adaptive selection of pre-defined user group clustering.
9. Addition of tools to assist users in naming sub-clusters and clusters Alternative Uses:

Although brand identification and analysis has been used throughout as a specific example and embodiment of the invention's methods, it should be understood that these specific examples and embodiments are not intended to be limiting. Rather, this is a general purpose process, as such it can be used anywhere users are trying to analyze and interpret the relationship between verbal and/or visual data elements.

Other areas where the methods of the invention may be used include:

1. A group of decision makers clustering decision options into groups, and sub-groups
2. A creative professional artist clustering ideas, images, objects and/or sounds into themes and sub-themes
3. A group of marketers collectively clustering ideas, images, sounds and/or objects into groups of creative categories
4. A group of product managers collectively clustering features into a feature set, and sub-sets
5. An author or group of authors clustering ideas into the themes or chapters of a published work
6. A group of customers collectively clustering products into groups, and sub-groups
7. An individual or group clustering personal ideas, images or objects into meaningful groups, and sub-groups
8. A sales person or team clustering ideas to present as different parts of a proposal
9. A group of friends clustering ideas to create a theme for an event 10. A group of fans clustering their favorite stories, shows, or events
11. An individual clustering the friends in their social network

The invention claimed is:

1. A method of visualizing the collective opinion of a group regarding one or more qualitative issues, said group consisting of at least two or more users, said qualitative issue being a branding issue, said method comprising;
   determining the N highest aspects of the issue and designating these as N Data Points;
   N being a number greater than 2 and less than 250;
   wherein said N highest aspects of the issue are determined by using an issue selection software program or module that presents a larger list of potential issues to said group, allows said users to individually select said N highest aspects of the larger list, and then in an iterative process presents the sum of the individual selections of said N highest aspects to said users, and allows for further rounds of issue editing and selection;
   using at least one software program running on at least one processor to:
   1) present at least one importance ranking graphical user interface to said users wherein said users may individually vote on the relative importance of said N Data Points;
   2) present at least one similarity ranking graphical user interface to said users wherein said users may individually group said N Data Points into at least two categories of greater and lesser similarity, and construct an user N×N similarity matrix for each user;
   3) compute a group N×N similarity matrix, where the contents of an individual cell of location i, j, in said group similarity matrix is a sum of the individual cell contents of location i, j, in each of said user N×N similarity matrices, and where the diagonal cells of said group similarity matrix have a value that is equal to the total number of users multiplied by two;
   4) use said group N×N similarity matrix and the transformation:
   $-1*(X_{ij}$–maximum cell value), where $X_{ij}$ is value of row i and column j, $i \in (1,N)$ and $j \in (1,N)$, N is the total number of Data Points, to analyze said N Data Points into clusters of greater and lesser similarity;
   5) summarize said clusters as a graphical output, and display at least one diagram showing the relationship between said clusters
   further associating an image and a title to each of said N Data Points, and showing said images and titles in any of said importance ranking user interfaces, similarity ranking user interfaces, or said diagram showing the relationship between said clusters;
   wherein said software is run on a network or Internet server computer or computing service, and said users interact with said server or service over one or more web browsers or Internet-enabled applications running on one or more computerized devices that are connected to said server or service over a local or long distance network connection.

2. The method of claim 1, wherein at least the size of the image of said N Data Points is adjusted in size according to said average group determination of importance on said diagram showing the relationship between clusters.

3. The method of claim 1, wherein said diagram showing the relationship between said clusters is a tree diagram.

4. The method of claim 3, wherein the level in the tree in which said individual Data Points are shown as being in a related cluster is adjustable by a software parameter.

5. The method of claim 1, wherein said qualitative issues comprise branding issues, and said N highest aspects of said issue comprise one or more issues selected from the group consisting of brand personality issues, brand audience need issues, values issues, vision issues, purpose issues, mission issues, culture issues, history issues, brand positioning issues, brand personality issues, and brand promise issues.

6. The method of claim 1, in which said larger list of potential issues is presented in the form of scrolling list on a touch sensitive screen, and in which said users may touch said screen to scroll up and down said larger list, press on list items to obtain a more complete definition of said list items.

7. The method of claim 6, in which an administrator or facilitator of said issue selection software program or module may further edit said larger list and more complete definition of said list items in response to group input.

8. A computerized system for visualizing the collective opinion of a group regarding one or more qualitative issues, said group consisting of at least two or more users, said qualitative issue being a branding issue, said system comprising;
   at least one processor to perform:
   determining the N highest aspects of the issue and designating these as N Data Points;
   N being a number greater than 2 and less than 250;
   wherein said N highest aspects of the issue are determined by using an issue selection software program or module, running on at least one computing processor, that presents a larger list of potential issues to said group, allows said users to individually select said N highest aspects of the larger list, and then in an iterative process presents the sum of the individual selections of said N highest aspects to said users, and allows for further rounds of issue editing and selection;
   using at least one software program or module, running on the at least one computing processor and associated memory to:
   1) present at least one importance ranking graphical user interface to said users wherein said users may individually vote on the relative importance of said N Data Points;
   2) present at least one similarity ranking graphical user interface to said users wherein said users may individually group said N Data Points into at least two categories of greater and lesser similarity, and construct an user N×N similarity matrix for each user;
   3) compute a group N×N similarity matrix, where the contents of an individual cell of location i, j, in said group similarity matrix is a sum of the individual cell contents of location i, j, in each of said user N×N similarity matrices, and where the diagonal cells of said group similarity matrix have a value that is equal to the total number of users multiplied by two;
   4) use said group N×N similarity matrix and the transformation:
   $-1*(X_{ij}$–maximum cell value), where $X_{ij}$ is value of row i and column j, $i \in (1,N)$ and $j \in (1,N)$, N is the total number of Data Points, to analyze said N Data Points into clusters of greater and lesser similarity;
   5) summarize said clusters as a graphical output, and display at least one diagram showing the relationship between said clusters;
   further associating an image and a title to each of said N Data Points, and showing said images and titles in any of said importance ranking user interfaces, similarity ranking user interfaces, or said diagram showing the relationship between said clusters;

wherein said software is run on a network or Internet server computer or computing service, and said users interact with said server or service over one or more web browsers or Internet-enabled applications running on one or more computerized devices that are connected to said server or service over a local or long distance network connection.

9. The system of claim 8, wherein at least the size of the image of said N Data Points is adjusted in size according to said average group determination of importance on said diagram showing the relationship between clusters.

10. The system of claim 8, wherein said diagram showing the relationship between said clusters is a tree diagram.

11. The system of claim 10, wherein the level in the tree in which said individual Data Points are shown as being in a related cluster is adjustable by a software parameter.

12. The system of claim 8, wherein said qualitative issues comprise branding issues, and said N highest aspects of said issue comprise one or more issues selected from the group consisting of brand personality issues, brand audience need issues, values issues, vision issues, culture issues, history issues, brand positioning issues, brand personality issues, and brand promise issues.

13. The system of claim 8, in which said larger list of potential issues is presented in the form of scrolling list on a touch sensitive screen, and in which said users may touch said screen to scroll up and down said larger list, press on list items to obtain a more complete definition of said list items.

14. The system of claim 8, in which an administrator or facilitator of said issue selection software program or module may further edit said larger list and more complete definition of said list items in response to group input.

\* \* \* \* \*